(12) United States Patent
Futamura et al.

(10) Patent No.: US 8,988,052 B2
(45) Date of Patent: Mar. 24, 2015

(54) CONTROL CIRCUIT FOR POWER SUPPLY INCLUDING A DETECTION CIRCUIT AND A REGULATION CIRCUIT FOR REGULATING SWITCHING TIMING

(75) Inventors: Kazuyoshi Futamura, Yokohama (JP); Takashi Matsumoto, Yokohama (JP); Ryuta Nagai, Kasugai (JP)

(73) Assignee: Spansion LLC, Sunnyvale, CA (US)

( * ) Notice: Subject to any disclaimer, the term of this patent is extended or adjusted under 35 U.S.C. 154(b) by 580 days.

(21) Appl. No.: 13/088,328

(22) Filed: Apr. 15, 2011

(65) Prior Publication Data
US 2012/0025797 A1    Feb. 2, 2012

(30) Foreign Application Priority Data

Jul. 30, 2010    (JP) .................................. 2010-172973

(51) Int. Cl.
| | | |
|---|---|---|
| G05F 1/59 | (2006.01) | |
| H02M 3/156 | (2006.01) | |
| H02M 3/158 | (2006.01) | |
| H02M 1/00 | (2006.01) | |

(52) U.S. Cl.
CPC ............ *H02M 3/156* (2013.01); *H02M 3/1588* (2013.01); *H02M 2001/0032* (2013.01); *Y02B 70/1466* (2013.01); *Y02B 70/16* (2013.01)
USPC ............ 323/271; 323/283; 323/285; 323/288

(58) Field of Classification Search
USPC .......................... 323/271, 282, 283, 285, 288
See application file for complete search history.

(56) References Cited

U.S. PATENT DOCUMENTS

| | | | |
|---|---|---|---|
| 6,984,966 B2 | 1/2006 | Kubota et al. | |
| 7,420,355 B2 * | 9/2008 | Liu et al. | 323/271 |
| 7,449,868 B2 * | 11/2008 | Elbanhawy | 323/271 |
| 7,498,791 B2 * | 3/2009 | Chen | 323/284 |
| 7,538,526 B2 * | 5/2009 | Kojima et al. | 323/225 |
| 7,652,945 B2 | 1/2010 | Chu et al. | |
| 7,675,276 B2 | 3/2010 | Ohkawa et al. | |
| 7,741,820 B2 * | 6/2010 | Huang et al. | 323/271 |

(Continued)

FOREIGN PATENT DOCUMENTS

| | | |
|---|---|---|
| JP | 2005-86854 A | 3/2005 |
| JP | 2009-124844 A | 6/2009 |

(Continued)

OTHER PUBLICATIONS

English language abstract for Japanese patent publication 2005-86854 A.

(Continued)

*Primary Examiner* — Jeffrey Sterrett
(74) *Attorney, Agent, or Firm* — Sterne, Kessler, Goldstein & Fox p.l.l.c.

(57) ABSTRACT

A control circuit for controlling a power supply including a first switch and a second switch coupled in series between a first potential and a second potential. The control circuit includes a detection circuit that detects a magnitude relation of a voltage value at a node between the first and second switches and a reference value during a period in which the first switch and the second switch are inactivated. The detection circuit generates a control signal corresponding to the magnitude relation. A regulation circuit regulates a switching timing of the second switch in response to the control signal to decrease a difference between the voltage value at the node and the reference value.

18 Claims, 18 Drawing Sheets

(56) References Cited

U.S. PATENT DOCUMENTS

| | | | |
|---|---|---|---|
| 7,872,461 B2 | 1/2011 | Yamada | |
| 8,314,599 B2 * | 11/2012 | Nagai | 323/285 |
| 2008/0211473 A1 | 9/2008 | Tlasksl et al. | |
| 2008/0298106 A1 | 12/2008 | Tateishi | |
| 2009/0153110 A1 * | 6/2009 | Huang | 323/271 |
| 2010/0013451 A1 * | 1/2010 | Nakamura et al. | 323/282 |
| 2012/0025797 A1 * | 2/2012 | Futamura et al. | 323/283 |
| 2012/0105031 A1 * | 5/2012 | Kumagai | 323/271 |
| 2012/0146599 A1 * | 6/2012 | Oyama | 323/271 |
| 2012/0212195 A1 * | 8/2012 | Kushida et al. | 323/271 |
| 2012/0235653 A1 * | 9/2012 | Chen et al. | 323/271 |
| 2013/0057237 A1 * | 3/2013 | Chen et al. | 323/271 |
| 2013/0057238 A1 * | 3/2013 | Fang et al. | 323/271 |
| 2013/0127428 A1 * | 5/2013 | Ide | 323/271 |

FOREIGN PATENT DOCUMENTS

| | | |
|---|---|---|
| JP | 2009-290986 A | 12/2009 |
| WO | WO-2006/123738 | 11/2006 |

OTHER PUBLICATIONS

English-Language Abstract for Japanese Patent Publication No. 2009-124844 A, published Jun. 4, 2009; 1 page.

* cited by examiner

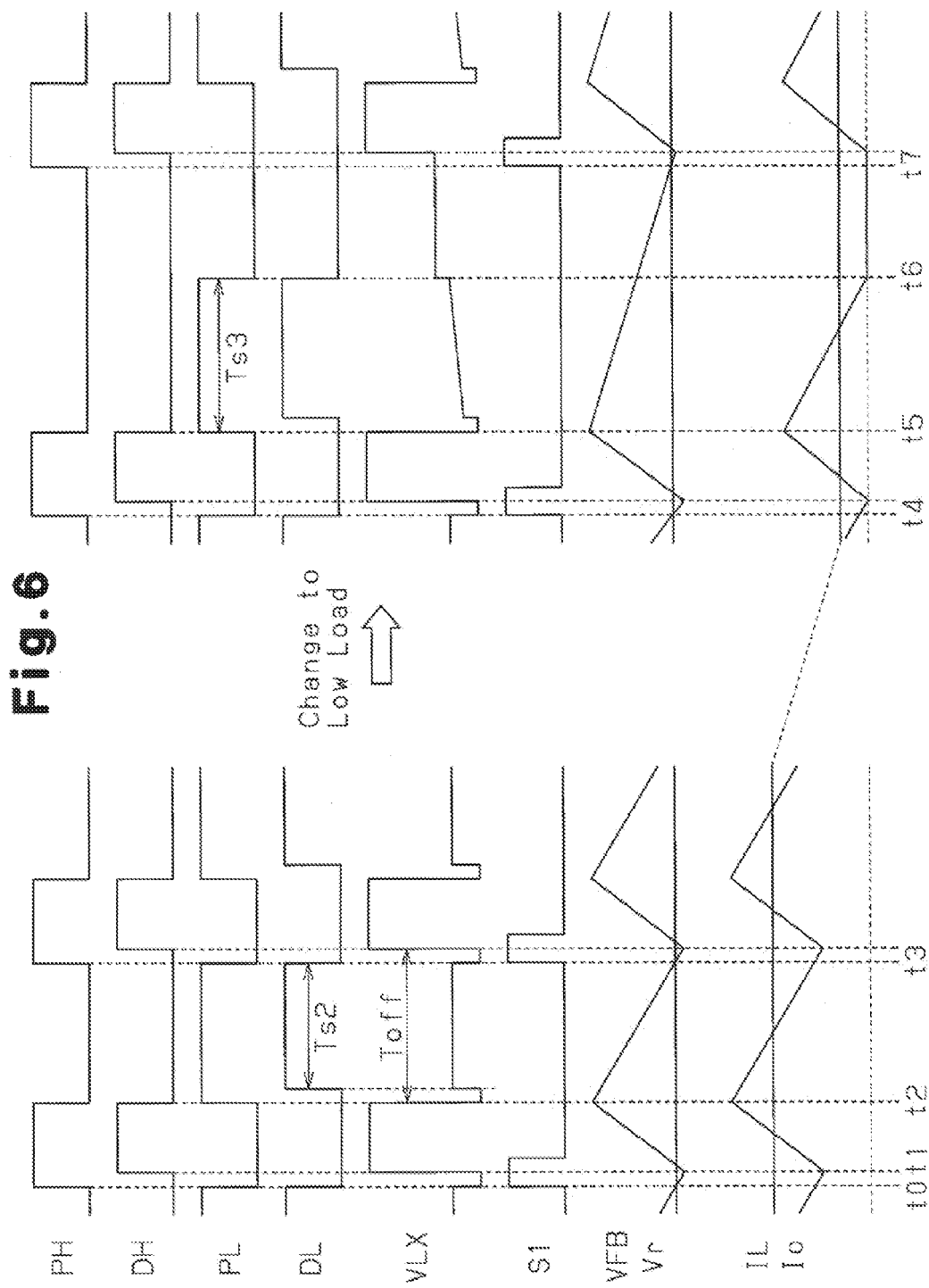

CONTROL CIRCUIT FOR POWER SUPPLY INCLUDING A DETECTION CIRCUIT AND A REGULATION CIRCUIT FOR REGULATING SWITCHING TIMING

CROSS-REFERENCE TO RELATED APPLICATIONS

This application is based upon and claims the benefit of priority from prior Japanese Patent Application No. 2010-172973, filed on Jul. 30, 2010, the entire contents of which are incorporated herein by reference.

FIELD

The present embodiment relates to a control circuit for a power supply, an electronic device, and a method for controlling the power supply.

BACKGROUND

In recent years, a synchronous rectification type DC-DC converter is often used as a switching type DC-DC converter configured to supply power supply voltage to various types of electronic devices. In a synchronous rectification type DC-DC converter, in which an MOS-transistor switch element is used as a rectification element to reduce a rectification loss. In such a DC-DC converter, a main transistor and a synchronization transistor are controlled so as to be alternately activated and inactivated to maintain an output voltage at a target voltage. That is, the main transistor is activated to supply energy from an input to an output and then inactivated to discharge the energy accumulated in a choke coil. In this state, in synchronization with a timing at which the energy accumulated in the choke coil is discharged to a load, the synchronization transistor is activated. Then, the output voltage is maintained at the target voltage by controlling a duty ratio of a pulse signal that drives the main transistor based on the output voltage or current.

In such a DC-DC converter, when the main transistor is inactivated and the load is small, current flows from the load to ground through the synchronization transistor. This results in an energy loss. Thus, the conversion efficiency of the DC-DC converter is reduced when the load is small.

To solve this problem, U.S. Patent Application Publication Nos. 2008/0246455 and 2008/0298106 describe a DC-DC converter configured to inactivate the synchronization transistor when a reverse flow of a coil current in a choke coil is detected. Further, International Patent Publication No. 2006/123738 describes a DC-DC converter that obtains a period from when the synchronization transistor is inactivated to when the voltage at a node between the main transistor and the synchronization transistor rises to a given threshold value. Based on the period, the DC-DC converter controls an inactivation period of the synchronization transistor in subsequent cycles.

However, process variations or the like may adversely affect the accuracy for detecting reverse flows. This decreases the conversion efficiency when the load is small.

Further, the coil current may flow reversely even when the inactivation period of the synchronization transistor is controlled based on the potential accumulated in a capacitor in the period from when the synchronization transistor is inactivated to when the voltage at the node between the main transistor and the synchronization transistor rises to the given threshold value. In this case, when charge is drawn out from the capacitor by applying a one-shot pulse in each cycle, the timing at which the synchronization transistor shifts to an inactivated state varies. In such a DC-DC converter, the activated period of the synchronization transistor is stabilized when the charging and discharging of the capacitor are balanced with each other. Accordingly, the timing at which the synchronization transistor is inactivated is always offset at a timing when the coil current is reduced to zero during a period in which the charged amount of the capacitor is balanced with the amount of charge drawn out by the one-shot pulse. Therefore, in such a DC-DC converter, the existence of an offset period lowers the reverse flow detection accuracy. This may reduce the conversion efficiency when the load is small.

SUMMARY

According to one aspect, a control circuit includes a detection circuit that detects a magnitude relation of a reference value and a voltage value at a node between a first switch and a second switch, which are coupled in series between a first potential and a second potential, during a period in which the first switch and the second switch are inactivated. The detection circuit generates a control signal corresponding to the magnitude relation. A regulation circuit regulates a switching timing of the second switch in response to the control signal to decrease a difference between the voltage value at the node and the reference value.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF DRAWINGS

FIG. 6 is a waveform chart schematically illustrating operations of the DC-DC converter in FIG. 1;

DESCRIPTION OF EMBODIMENTS

First Embodiment

A first embodiment will now be discussed with reference to FIGS. 1 to 8.

Figure 1:
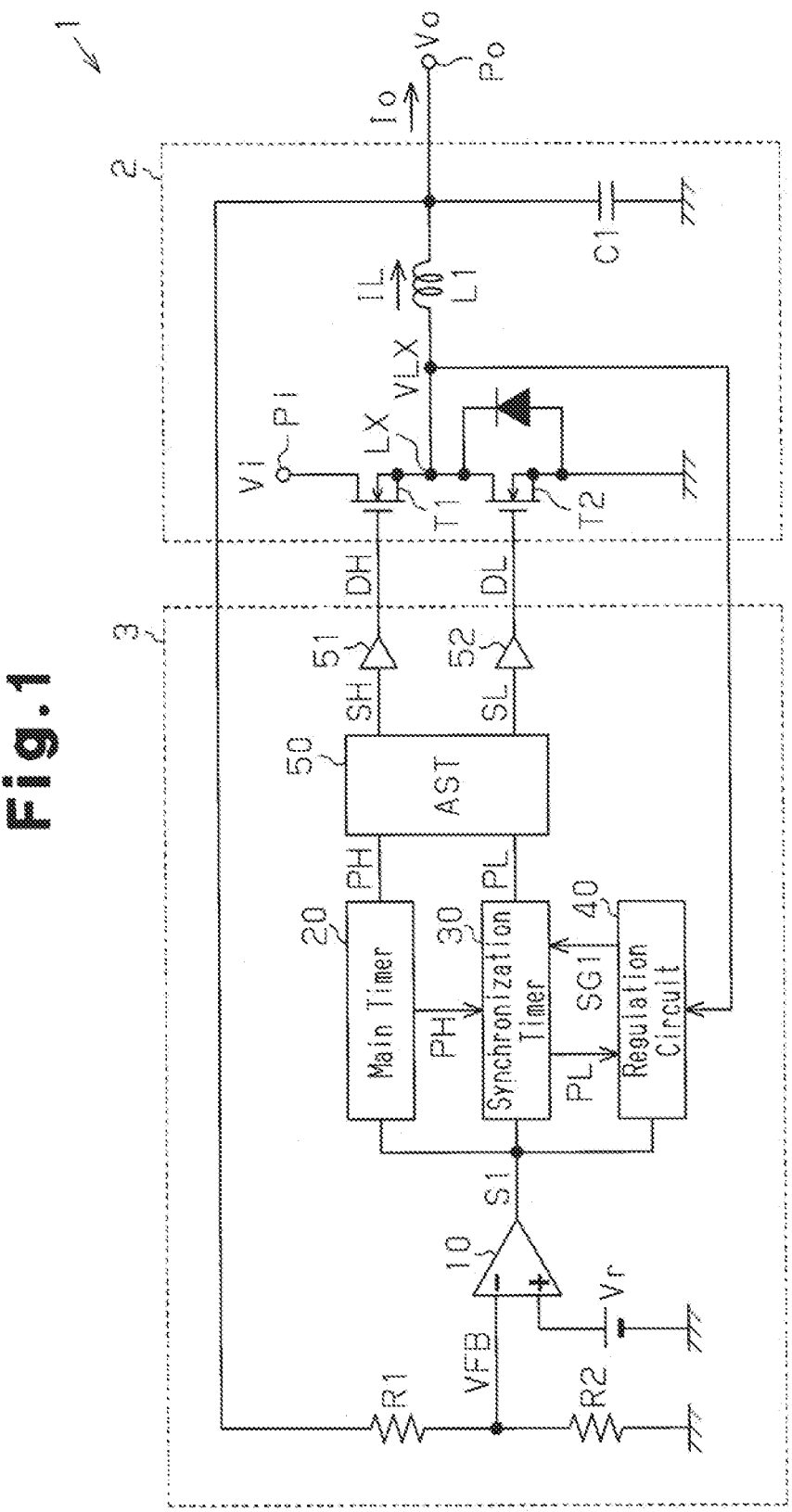
FIG. 1 is a block circuit diagram schematically illustrating a DC-DC converter in a first embodiment.

As illustrated in FIG. 1, a DC-DC converter 1 includes a converter unit 2, which generates an output voltage Vo based on an input voltage Vi (first potential), and a control circuit 3, which controls the converter unit 2.

The converter unit 2 includes a main transistor T1, a synchronization transistor T2, a coil L1, and a capacitor C1.

The main transistor T1 and the synchronization transistor T2 are N-channel MOS transistors. The transistor T1 has a first terminal (drain) coupled to an input terminal Pi supplied with the input voltage Vi and a second terminal (source). The transistor T2 has a first terminal (drain) coupled to the second terminal of the transistor T1 and a power supply line (ground in this case) having a lower potential than the input voltage Vi. In such a manner, the transistors T1 and T2 are coupled in series between the input terminal Pi and the ground (second potential).

Further, the transistor T1 has a control terminal (gate) supplied with a control signal DH from the control circuit 3, while the transistor T2 has a control terminal (gate) supplied with a control signal DL from the control circuit 3. Those transistors T1 and T2 are activated and inactivated in response to the control signals DH and DL, respectively. The control circuit 3 generates the control signals DH and DL in such a manner as to activate and inactivate the transistors T1 and T2 in a complementary manner. That is, the transistors T1 and T2 are one example of the switch circuit. FIG. 1 illustrates a body diode of the transistor T2.

A node LX between those transistors T1 and T2 is coupled to a first terminal (input terminal) of the coil L1. A second terminal (output terminal) of the coil L1 is coupled to an output terminal Po, which outputs the output voltage Vo. In such a manner, the transistor T1 and the coil L1 on the main side are coupled in series between the input terminal Pi and the output terminal Po. Further, a second terminal of the coil L1 is coupled to a first terminal of the smoothing capacitor C1, a second terminal of which capacitor C1 is coupled to the ground. The capacitor C1 is included in a smoothing circuit configured to smooth the output voltage Vo.

In such a converter unit 2, when the main transistor T1 is activated and the synchronization transistor T2 is inactivated, a coil current IL corresponding to a difference between the input voltage Vi and the output voltage Vo flows through the coil L1. This causes energy (power) to be accumulated in the coil L1. When the main transistor T1 is inactivated and the synchronization transistor T2 is activated, the coil L1 discharges the accumulated energy so that an induction current (coil current IL) flows through the coil L1. Through such operations, the output voltage Vo stepped down from the input voltage Vi is generated. Then, the output voltage Vo is supplied to a load (not illustrated) coupled to the output terminal Po. Further, the load is supplied with an output current Io.

The internal configuration of the control circuit 3 will now be described.

The control circuit 3 includes resistors R1 and R2, a comparator 10, a main timer 20, a synchronization timer 30, a synchronous rectification period regulation circuit (regulation circuit) 40, an anti-shoot-through (AST) 50, and driver circuits 51 and 52.

The comparator 10 has an inverting input terminal supplied with a voltage corresponding to the output voltage Vo. In the first embodiment, a voltage generated through the resistors R1 and R2 is supplied to the inverting terminal of the comparator 10. The output voltage Vo is fed back to a first terminal of the resistor R1, while a second terminal of the resistor R1 is coupled to a first terminal of the resistor R2. A second terminal of the resistor R2 is coupled to the ground. A node between the resistors R1 and R2 is coupled to the inverting terminal of the comparator 10. The resistors R1 and R2 are configured to divide the output voltage Vo corresponding to their resistance values, to generate a divided voltage (feedback voltage) VFB. A value of the feedback voltage VFB corresponds to a ratio between the resistance values of the resistors R1 and R2 as well as a difference in potential between the output voltage Vo and the ground. Therefore, the resistors R1 and R2 generate the feedback voltage VFB proportional to the output voltage Vo.

The comparator 10 has a non-inverting input terminal supplied with a reference voltage Vr. The comparator 10 compares the feedback voltage VFB and the reference voltage Vr to each other and generates a signal S1 corresponding to a result of the comparison. In the first embodiment, the comparator 10 generates the signal S1 having an L level when the feedback voltage VFB is higher than the reference voltage Vr and the signal S1 having an H level when the feedback voltage VFB is lower than the reference voltage Vr. The signal S1 is supplied to the main timer 20, the synchronization timer 30, and the regulation circuit 40. The reference voltage Vr is set corresponding to a target voltage of the output voltage Vo.

The main timer 20 generates a main pulse signal PH that provides the H level for a given period of time from a rise timing of the H-level signal S1 in response to this signal S1. The given period of time refers to a period that depends on the input voltage Vi and the output voltage Vo, for example. That is, the main timer 20 generates the main pulse signal PH that remains at the H level for a period of time that depends on the input voltage Vi and the output voltage Vo. Then, the main pulse signal PH is supplied to the timer 30 and the AST 50 on the synchronization side.

The synchronization timer 30 receives the signal S1 and the main pulse signal PH, to generate a synchronization pulse signal PL. In a continuous current mode (CCM) in which the coil current IL changes continuously, the synchronization timer 30 generates the H-level synchronization pulse signal PL in response to fall of the main pulse signal PH and, in response to rise of the signal S1, generates the L-level synchronization pulse signal PL. Further, In a discontinuous current mode (DCM) in which the coil current IL changes discontinuously, the synchronization timer 30 generates the synchronization pulse signal PL that remains at the H level for a given period of time from a fall timing of the L-level main pulse signal PH in response to this pulse signal PH. The given period of time refers to a period that depends on the input voltage Vi and the output voltage Vo, for example, and is regulated by the regulation circuit 40. Then, the synchronization pulse signal PL is supplied to the regulation circuit 40 and the AST 50.

The regulation circuit 40 is coupled to the node LX between the main transistor T1 and the synchronization transistor T2. The regulation circuit 40 generates a regulation signal SG1 corresponding to a voltage VLX at the node LX when the synchronization transistor T2 is inactivated to optimize an activated period (i.e., inactivation timing) of the synchronization transistor T2. The regulation signal SG1 is supplied to the synchronization timer 30. The phrase of "to optimize the activated period (inactivation timing) of the transistor T2" means to regulate the transistor T2's inactivation period (inactivation timing) in such a manner that the transistor T2 may be inactivated when the coil current IL is 0 A. This also applies to the following description.

For example, when the synchronization transistor T2 is inactivated before the coil current IL flows reversely, that is, the inactivation timing of the transistor T2 is advanced, the regulation circuit 40 generates the regulation signal SG1 in such a manner that the inactivation timing of the transistor T2 may be delayed. When the synchronization transistor T2 is inactivated after the coil current IL flows reversely, that is, the inactivation timing of the transistor T2 is retarded, the regulation circuit 40 generates the regulation signal SG1 in such a manner that the inactivation timing of the transistor T2 may be advanced.

The AST 50 generates control signals SH and SL based on the main pulse signal PH and the synchronization pulse signal PL so that the transistors T1 and T2 in the converter unit 2 may be activated and inactivated in a complementary manner and may not be activated simultaneously.

The driver circuit 51 supplies the main transistor T1 with the H-level control signal DH in response to an H-level control signal SH and supplies it with the L-level control signal DH in response to an L-level control signal SH. The transistor T1 is activated in response to the H-level control signal DH and inactivated in response to the L-level control signal DH.

The driver circuit 52 supplies the synchronization transistor T2 with the H-level control signal DL in response to an H-level control signal SL and supplies it with the L-level control signal DL in response to an L-level control signal SL. The transistor T2 is activated in response to the H-level control signal DL and inactivated in response to the L-level control signal DL.

Therefore, in the first embodiment, the main transistor T1 is activated in response to the H-level control signal DH based on the H-level main pulse signal PH and inactivated in response to the L-level control signal DH based on the L-level main pulse signal PH. That is, the main timer 20 generating the main pulse signal PH determines the activated period of the main transistor T1. Similarly, the synchronization transistor T2 is activated in response to the H-level control signal DL based on the H-level synchronization pulse signal PL and inactivated in response to the L-level control signal DL based on the L-level synchronization pulse signal PL. That is, the synchronization timer 30 generating the synchronization pulse signal PL determines the activated period of the synchronization transistor T2.

One example of the main timer 20 will now be described with reference to FIG. 2.

Figure 2:
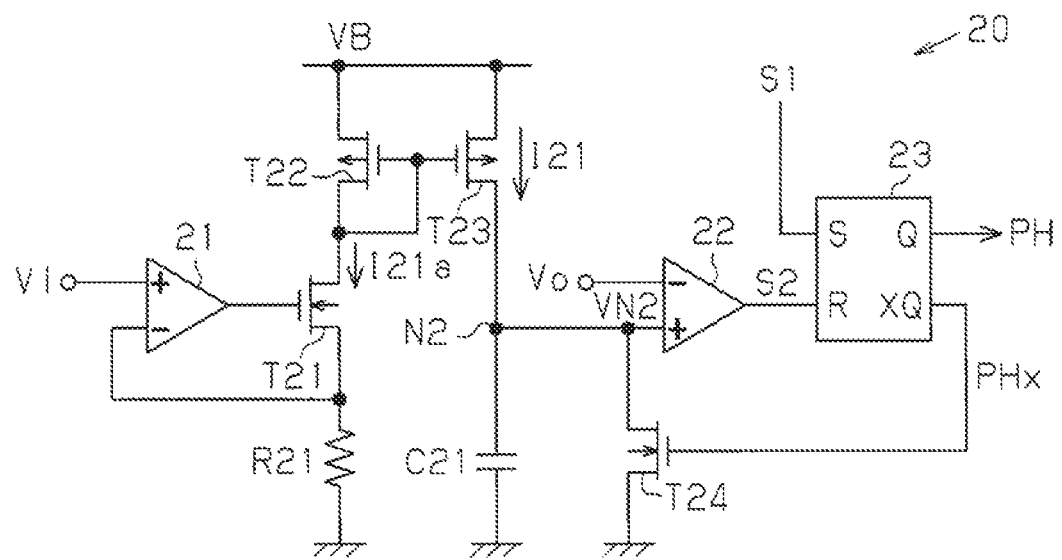
FIG. 2 is a circuit diagram illustrating an internal configuration example of a main timer in FIG. 1.

As illustrated in FIG. 2, the main timer 20 includes operational amplifiers 21 and 22, a resistor R21, a capacitor C21, transistors T21 to T24, and an RS flip-flop circuit (RS-FF circuit) 23.

The operational amplifier 21 is supplied with the input voltage Vi at its non-inverting input terminal. An inverting input terminal of the operational amplifier 21 is coupled to a first terminal of the resistor R21. A second terminal of the resistor R21 is coupled to the ground. Further, the first terminal of the resistor R21 is coupled to a source of the N-channel MOS transistor T21. The transistor T21 has its gate coupled to an output terminal of the operational amplifier 21 and its drain coupled to a drain of a P-channel MOS transistor T22.

A difference in potential corresponding to a current flowing through the resistor R21 and its resistance value occurs between the first and second terminals of the resistor R21. The operational amplifier 21 generates a gate voltage of the transistor T21 so that the potential of a node between the resistor R21 and the transistor T21 may be equal to the input voltage Vi. In other words, the operational amplifier 21 controls the gate voltage so that the voltage at the first terminal of the resistor R21 may be the input voltage Vi. Therefore, the resistor R21 is supplied with a current I21a that corresponds to a resistance value of the resistor R21 and a difference in potential (input voltage Vi) between the first and second terminals of the resistor R21. Accordingly, the current I21a may be expressed as:

Equation 1

$$I21a = \frac{Vi}{R21} \quad (1)$$

The transistor T22 is supplied with a bias voltage VB at its source. Further, the transistor T22 has its gate coupled to a drain of this transistor T22 and a gate of the P-channel MOS transistor T23. The bias voltage VB may as well be the input voltage Vi or generated by a power supply circuit not illustrated. The bias voltage VB is supplied also to a source of the transistor T23. Therefore, the transistors T22 and T23 are included in a current mirror circuit. The transistors T22 and T23 have the same electrical characteristics. Accordingly, the current mirror circuit supplies the transistor T23 with the same value of current (i.e., Vi/R21) as that flowing through the transistor T22.

The transistor T23 has its drain coupled to a first terminal of the capacitor C21 and a drain of the N-channel MOS transistor T24. A second terminal of the capacitor C21 and a source of the transistor T24 are coupled to the ground. In such a manner, the transistor T24 is coupled in parallel with the capacitor C21. The capacitor C21 is supplied by the transistor T23 with a current I21 that depends on the input voltage Vi.

A node N2 between the transistors T23 and T24 is coupled to a non-inverting input terminal of the operational amplifier 22. The operational amplifier 22 is supplied with the output voltage Vo at its inverting input terminal. The operational amplifier 22 generates a signal S2 corresponding to a result of comparison between a voltage VN2 at the node N2 and the output voltage Vo. The signal S2 is supplied to a reset terminal of the RS-FF circuit 23. For example, the operational amplifier 22 outputs the L-level signal S2 when the VN2 is lower than the output voltage Vo and H-level signal S2 when the VN2 is higher than the output voltage Vo.

The RS-FF circuit 23 is supplied at its set terminal with the signal S1 generated by the comparator 10 (see FIG. 1). The RS-FF circuit 23 outputs the H-level main pulse signal PH in response to the H-level signal S1 and the L-level main pulse signal PH in response to the H-level signal S2. That is, the H-level signal S1 functions as a set signal for the RS-FF circuit 23, and the H-level signal S2 functions as a reset signal for the RS-FF circuit 23. With this, the main pulse signal PH appearing at the output terminal of the RS-FF circuit 23 is supplied to the synchronization timer 30 and the AST 50.

Further, the RS-FF circuit 23 has an inverted output terminal, at which an L-level inverted signal PHx appears in response to the H-level signal S1 and an H-level inverted signal PHx appears in response to the H-level signal S2. Then, the inverted signal PHx appearing at the inverted output terminal of the RS-FF circuit 23 is supplied to the transistor T24 at its gate.

As described above, the main transistor T1 (see FIG. 1) is activated when the main pulse signal PH is at the H level and inactivated when the main pulse signal PH is at the L level. In contrast, the transistor T24 is activated when the inverted signal PHx is at the H level, that is, the main pulse signal PH is at the L level (the transistor T1 is inactivated). When the transistor T24 is activated, the first and second terminals of the capacitor C21 are coupled to each other so that the voltage VN2 of the first terminal (node N2) of the capacitor C21 is set to a ground level. When the inverted signal PHx is at the L level, that is, the main pulse signal PH is at the H level (the transistor T1 is activated), the transistor T24 is inactivated. When the transistor T24 is inactivated, the capacitor C21 is charged with the current I21 (current that depends on the input voltage Vi) supplied from the transistor T23. As a result, the voltage VN2 at the node N2 rises corresponding to the input voltage Vi from the ground level.

For example, when the main transistor T1 is inactivated, the main timer 20 electrically short-circuits the first and second terminals of the capacitor C1. This resets the voltage VN2 of the node N2 to the ground level. Then, when the transistor T1 is activated, the main timer 20 starts charging the capacitor C21. As a result, the voltage VN2 of the node N2 rises according to the input voltage Vi. Then, when the voltage VN2 becomes higher than the output voltage Vo, the operational amplifier 22 outputs the H-level signal S2 (reset signal). Then, the main pulse signal PH falls to the L level to inactivate the main transistor T1. Therefore, a period from a time when the main pulse signal PH has risen to the H level to a time when the H-level signal S2 (reset signal) is output, that is, a pulse width of the main pulse signal PH depends on the input voltage Vi and the output voltage Vo. For example, an activated period Ton of the main transistor T1 may be expressed as:

Equation 2

$$Ton = \frac{Vo}{Vi} \times R21 \times \frac{1}{C21} \quad (2)$$
$$Ton = \frac{Vo}{Vi} \times To$$

where, $$To = \frac{R21}{C21}$$

Meanwhile, when the input voltage Vi and the output voltage Vo are stable, the output voltage Vo takes on a voltage corresponding to the input voltage Vi and an on-duty ratio of the main transistor T1. The on-duty ratio of the main transistor T1 is expressed as a ratio of the activated period of the transistor T1 with respect to a period at which the transistor T1 is activated, that is, its switching cycle. Therefore, the output voltage Vo is given by:

Equation 3

$$Vo = \frac{Ton}{T} \times Vi \quad (3)$$

The switching cycle T is a sum of the activated period Ton and an inactivation period Toff of the transistor T1. The activated period Ton may also be expressed by:

Equation 4

$$Ton = \frac{Vo}{Vi} \times T, \quad (4)$$

so that the inactivated state Toff may be expressed by:

Equation 5

$$Toff = \frac{Vi - Vo}{Vi} \times T \quad (5)$$

The following relationship is established based on Equations (2) and (4):

Equation 6

$$To = T \quad (6)$$

One example of the synchronization timer 30 will now be described with reference to FIG. 3.

Figure 3:
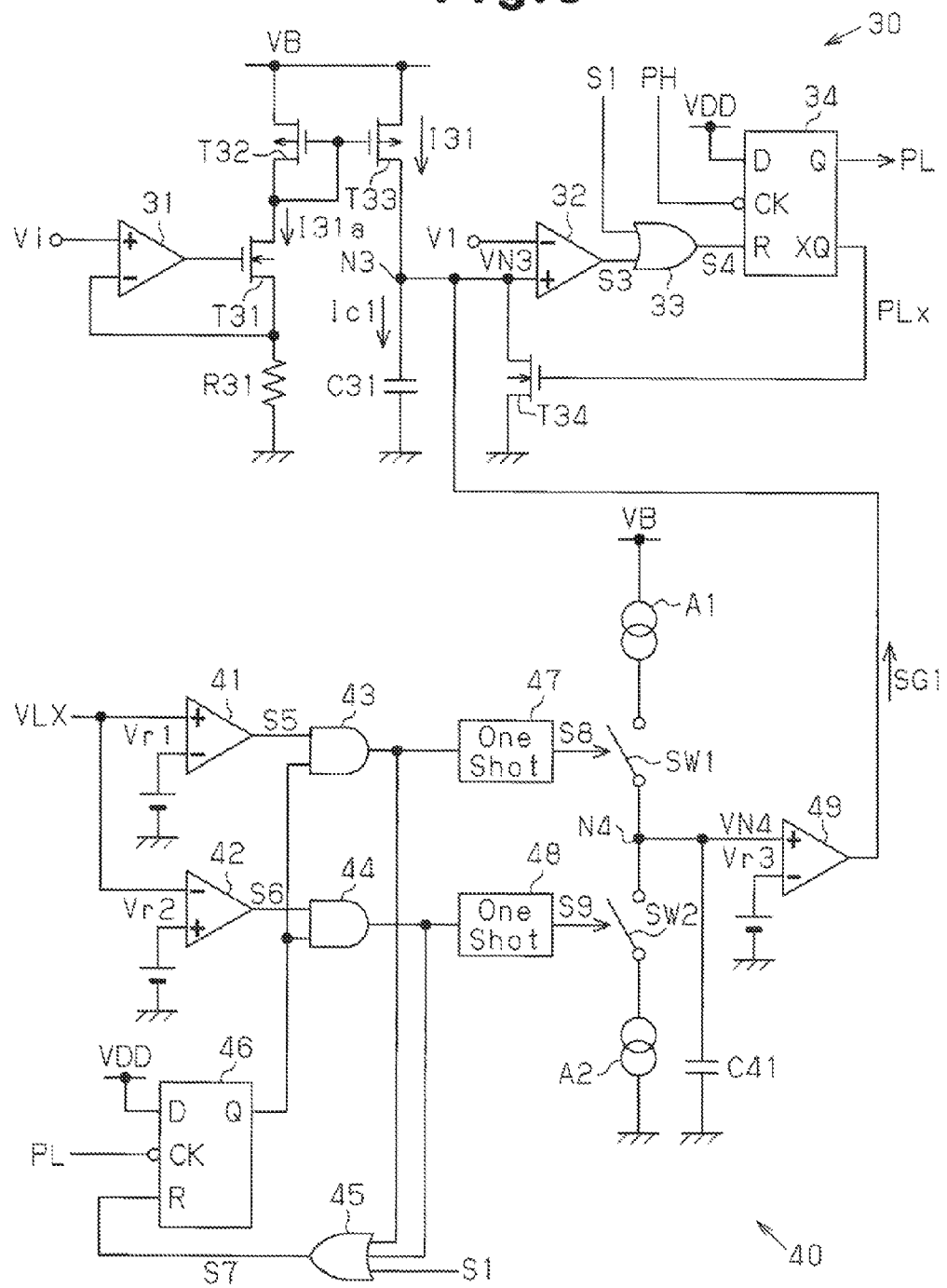
FIG. 3 is a circuit diagram illustrating an internal configuration example of a synchronization timer and a synchronous rectification period regulation circuit in FIG. 1.

As illustrated in FIG. 3, the synchronization timer 30 includes operational amplifiers 31 and 32, a resistor R31, a capacitor C31, transistors T31 to T34, an OR circuit 33, and a D flip-flop circuit (D-FF circuit) 34.

The operational amplifier 31 is supplied with the input voltage Vi at its non-inverting input terminal. The operational amplifier 31 has its inverting input terminal coupled to a first terminal of the resistor R31. A second terminal of the resistor R31 is coupled to the ground. Further, the first terminal of the resistor R31 is coupled to a source of the N-channel MOS transistor T31. The transistor T31 has its gate coupled to an output terminal of the operational amplifier 31, a drain of which transistor T31 is coupled to a drain of the P-channel MOS transistor T32.

A difference in potential corresponding to a current flowing through the resistor R31 and its resistance value occurs between the first and second terminals of the resistor R31. The operational amplifier 31 generates a gate voltage of the transistor T31 so that the potential of a node between the resistor R31 and the transistor T31 may be equal to the input voltage Vi. In other words, the operational amplifier 31 controls the gate voltage so that the voltage at the first terminal of the resistor R31 may be the input voltage Vi. Therefore, the resistor R31 is supplied with a current I31a that corresponds to a resistance value of the resistor R31 and a difference in potential (input voltage Vi) between the first and second terminals of the resistor R31. Accordingly, the current I31a may be expressed as:

Equation 7

$$I31a = \frac{Vi}{R31} \qquad (7)$$

The transistor T32 is supplied with the bias voltage VB at its source. Further, the transistor T32 has its gate coupled to a drain of this transistor T32 and a gate of the P-channel MOS transistor T33. The bias voltage VB is supplied also to a source of the transistor T33. Therefore, the transistors T32 and T33 are included in a current mirror circuit. The transistors T32 and T33 have the same electrical characteristics. Accordingly, the current mirror circuit supplies the transistor T33 with the same value of current (i.e., Vi/R31) as that flowing through the transistor T32.

The transistor T33 has its drain coupled to a first terminal of the capacitor C31 and a drain of the N-channel MOS transistor T34. A second terminal of the capacitor C31 and a source of the transistor T34 are coupled to the ground. In such a manner, the transistor T34 is coupled in parallel with the capacitor C31. The capacitor C31 is supplied with a current Ic1 corresponding to the current I31.

A node N3 between the transistors T33 and T34 is coupled to a non-inverting input terminal of the operational amplifier 32. The operational amplifier 32 is supplied at its inverting input terminal with a first voltage V1 that depends on the input voltage Vi and the output voltage Vo (for example, Vi−Vo). The operational amplifier 32 generates a signal S3 corresponding to a result of comparison between a voltage VN3 at the node N3 and first voltage V1. The signal S3 is supplied to the OR circuit 33. For example, the operational amplifier 32 outputs the L-level signal S3 when the VN3 is lower than the first voltage V1 and the H-level signal S3 when the VN3 is higher than the first voltage V1.

The OR circuit 33 is supplied with the signal S3 from the operational amplifier 32 as well as the signal S1 from the comparator 10 (see FIG. 1). The OR circuit 33 performs a logical OR operation with the signal S3 from the operational amplifier 32 and the signal S1 from the comparator 10 to generate a signal indicating the result of the logical operation. For example, the OR circuit 33 generates an H-level signal S4 (reset signal) when either one of the signals S1 and S3 is at the H level. Further, the OR circuit 33 generates an L-level signal S4 when both of the signals S1 and S3 are at the L level. The signal S4 is applied to a reset terminal of the D-FF circuit 34.

The D-FF circuit 34 is supplied with a high-potential power supply voltage VDD at its input terminal (i.e., data terminal). Further, the D-FF circuit 34 is supplied with the main pulse signal PH at its inverted clock terminal. The D-FF circuit 34 outputs the synchronization pulse signal PL having a level of the power supply voltage VDD applied to the data terminal, that is, the H level in synchronization with a trailing edge of the main pulse signal PH. Further, the D-FF circuit 34 outputs the L-level synchronization pulse signal PL in response to the H-level signal S4 (reset signal). Then, the synchronization pulse signal PL appearing at an output terminal of the D-FF circuit 34 is supplied to the regulation circuit 40 and the AST 50.

Further, the D-FF circuit 34 has an inverted output terminal, from which an L-level inverted signal PLx is output in synchronization with the trailing edge of the main pulse signal PH and an H-level inverted signal PLx is output in response to the H-level signal S4. Then, the inverted signal PLx appearing at the inverted output terminal of the D-FF circuit 34 is supplied to a gate of the transistor T34.

As described above, the synchronization transistor T2 (see FIG. 1) is activated when the synchronization pulse signal PL is at the H level and inactivated when the synchronization pulse signal PL is at the L level. In contrast, the transistor T34 is activated when the inverted signal PLx is at the H level, that is, the synchronization pulse signal PL is at the L level (the transistor T2 is inactivated). When the transistor T34 is activated, the first and second terminals of the capacitor C31 are coupled to each other so that the voltage VN3 of the first terminal (node N3) of the capacitor C31 is set to the ground level. When the inverted signal PLx is at the L level, that is, the synchronization pulse signal PL is at the H level (the transistor T2 is on), the transistor T34 is inactivated. When the transistor T34 is inactivated, the capacitor C31 is charged with the current Ic1 corresponding to the current I31 supplied from the transistor T33. As a result, the voltage VN3 at the node N3 rises corresponding to the input voltage Vi from the ground level.

That is, when the synchronization transistor T2 is inactivated, the synchronization timer 30 electrically short-circuits the first and second terminals of the capacitor C31, thereby resetting the voltage VN3 of the node N3 to the ground level. Then, when the transistor T2 is activated, the synchronization timer 30 starts charging the capacitor C31. As a result, the voltage VN3 of the node N3 rises according to the input voltage Vi. Then, when the voltage VN3 becomes higher than the first voltage V1 (i.e., Vi−Vo), the operational amplifier 32 outputs the H-level signal S3, to cause the OR circuit 33 to provide the H-level signal S4 (reset signal). Then, the synchronization pulse signal PL falls to the L level to inactivate the main transistor T1. Therefore, a period from a time when the synchronization pulse signal PL has risen to the H level to a time when the H-level signal S3 is output, in other words, a pulse width of the synchronization pulse signal PL depends on the input voltage Vi and the output voltage Vo. For example, a period Ts1 from a time when the synchronization pulse signal PL has risen to the H level to a time when the H-level signal S3 is output may be expressed as:

Equation 8

$$Ts1 = \frac{Vi - Vo}{Vi} \times R31 \times \frac{1}{C31} \qquad (8)$$

In the first embodiment, the resistors R21 and R31 are set to have the same resistance value and the capacitors C21 and C31 are also set to have the same capacitance value. Accordingly, the period Ts1 may be expressed as:

Equation 9

$$Ts1 = \frac{Vi - Vo}{Vi} \times To \qquad (9)$$

where, $$To = \frac{R31}{C31} = \frac{R21}{C21}$$

Further, the pulse width of the synchronization pulse signal PL, that is, the activated period of the synchronization transistor T2 is adjusted finely in accordance with the regulation signal SG1 supplied from the regulation circuit 40. That is, Equation (9) gives the period Ts1 which is set by the synchronization timer 30 before regulation by use of the regulation signal SG1.

Further, also in a case where (for example, in the CCM) the H-level signal S1 is output from the comparator 10 before the H-level signal S3 is output from the operational amplifier 32, this H-level signal S1 causes the synchronization pulse signal PL to fall.

Figure 4:
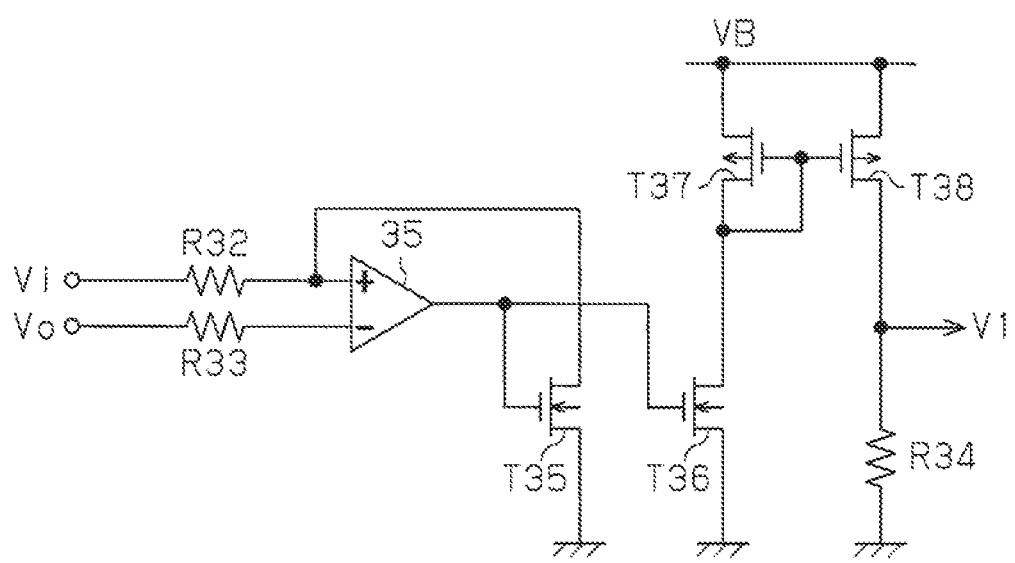
FIG. 4 is a circuit diagram illustrating an internal configuration example of a voltage source that may be utilized in a synchronization timer in FIG. 3.

The following will describe one example of a voltage supply circuit generating the first voltage V1 with reference to FIG. 4.

As illustrated in FIG. 4, an operational amplifier 35 is supplied at its non-inverting input terminal with the input voltage Vi through a resistor R32. Further, the operational amplifier 35 is supplied at its inverting input terminal with the output voltage Vo through a resistor R33. The operational amplifier 35 has its output terminal coupled to the respective gates of N-channel MOS transistors T35 and T36. The transistors T35 and T36 have their sources coupled to the ground.

The transistor T35 has its drain coupled to the non-inverting input terminal. Further, the transistor T36 has its drain coupled to a drain of a P-channel MOS transistor T37.

The transistor T37 is supplied with the bias voltage VB at its source. Further, the transistor T37 has its gate coupled to the drain of the transistor T37 and a gate of a P-channel MOS transistor T38. The transistor T38 is supplied with the bias voltage VB also at its source. Therefore, the transistors T37 and T38 are included in a current mirror circuit. The transistors T37 and T38 have the same electrical characteristics. Accordingly, the current mirror circuit supplies the transistor T38 with the same value of current as that flowing through the transistor T37.

The transistor T38 has its drain coupled to a first terminal of a resistor R34, a second terminal of which resistor R34 is coupled to the ground. The resistors R32 to R34 are set to have the same resistance value. Further, the resistor R34 converts a drain current through the transistor T38 into a voltage corresponding to the drain current of this transistor T38 and a resistance value of the resistor R34. As a result, the aforesaid first voltage V1 (i.e., Vi−Vo) is generated at a node between the transistor T38 and the resistor T34.

One example of the synchronization rectification period regulation circuit 40 will now be described with reference to FIG. 3.

As illustrated in FIG. 3, the regulation circuit 40 includes comparators 41 and 42, AND circuits 43 and 44, an OR circuit 45, a D-FF circuit 46, one-shot circuits 47 and 48, switches SW1 and SW2, current supplies A1 and A2, a capacitor C41, and a transconductance amplifier 49.

Figure 5A:
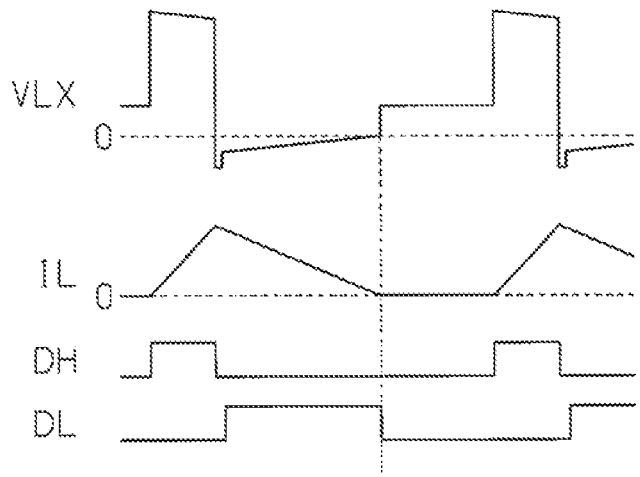
FIGS. 5A to 5C are explanatory waveform charts illustrating the behavior of a voltage VLX in FIG. 1.
Figure 5B:
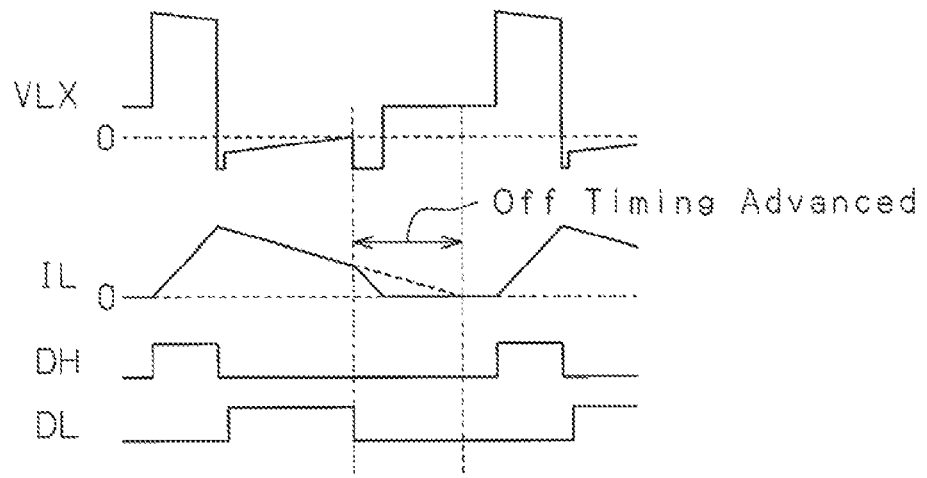
Figure 5C:
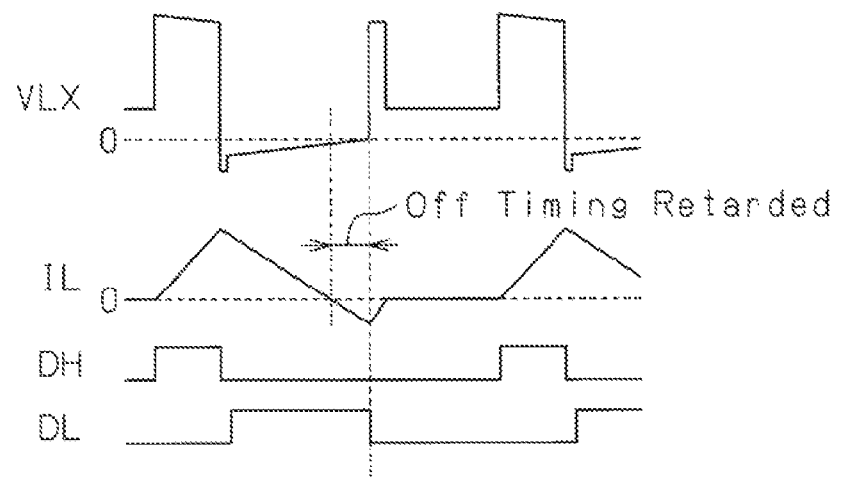

Behaviors of the voltage VLX of the node LX (see FIG. 1) change as illustrated in FIGS. 5A to 5C in response to the inactivation timing of the synchronization transistor T2. That is, as illustrated in FIG. 5A, in an ideal case, that is, when the transistor T2 falls into the level to be inactivated when the coil current IL is zero, the voltage VLX at the node LX when the transistor T2 is inactivated is roughly 0 (zero) V. Further, when the inactivation timing of the synchronization transistor T2 is advanced as illustrated in FIG. 5B, that is, the transistor T2 falls into the level to be inactivated before the coil current IL flows reversely, the voltage VLX at the node LX when the transistor T2 is inactivated takes on a value lower than 0 V. Conversely, when the inactivation timing of the synchronization transistor T2 is delayed as illustrated in FIG. 5C, that is, the transistor T2 falls in level to be inactivated after the coil current IL flows reversely, the voltage VLX at the node LX when the transistor T2 is inactivated takes on a value higher than 0 V. Therefore, by monitoring the voltage value of the voltage VLX at the node LX when the transistor T2 is inactivated, it is possible to determine whether the inactivation timing of the transistor T2 is advanced or delayed.

As illustrated in FIG. 3, the comparator 41 is supplied at its non-inverting input terminal with the voltage VLX at the node LX between the transistors T1 and T2. Further, the comparator 41 is supplied at its inverting input terminal with a first reference voltage Vr1. The first reference voltage Vr1 is set to a positive potential (for example, +0.2 V). The comparator 41 generates a signal S5 corresponding to a result of comparison between the voltage VLX at the node LX and the first reference voltage Vr1 and supplies it to the AND circuit 43. For example, the comparator 41 outputs the L-level signal S5 when the voltage VLX is lower than the first reference voltage Vr1 and the H-level signal S5 when the voltage VLX is higher than the first reference voltage Vr1. That is, the comparator 41 outputs the H-level signal S5 when the voltage VLX becomes higher than the first reference voltage Vr1 because the inactivation timing of the transistor T2 is delayed.

The comparator 42 is supplied also at its inverting input terminal with the voltage VLX at the node between the transistors T1 and T2. Further, the comparator 42 is supplied at its non-inverting input terminal with a second reference voltage Vr2. The second reference voltage Vr2 is set to a negative potential (for example, −0.2 V). The comparator 42 generates a signal S6 corresponding to a result of comparison between the voltage VLX at the node LX and the second reference voltage Vr2 and supplies it to the AND circuit 44. For example, the comparator 42 outputs the L-level signal S6 when the voltage VLX is higher than the second reference voltage Vr2 and the H-level signal S6 when the voltage VLX is lower than the second reference voltage Vr2. That is, the comparator 42 outputs the H-level signal S6 when the voltage VLX becomes lower than the second reference voltage Vr2 because the inactivation timing of the transistor T2 is advanced.

The AND circuits 43 and 44 also receive an output signal from the D-FF circuit 46. The AND circuit 43 performs a logical AND operation with the signal S5 from the comparator 41 and the output signal from the D-FF circuit 46 to generate an output signal indicating the result of the logical operation. The output signal from the AND circuit 43 is supplied to the OR circuit 45 and the one-shot circuit 47. The AND circuit 44 performs a logical AND operation with the signal S6 from the comparator 42 and the output signal from the D-FF circuit 46 to generate an output signal indicating the result of the logical operation. The output signal from the AND circuit 44 is supplied to the OR circuit 45 and the one-shot circuit 48.

The OR circuit 45 further receives also the signal S1 from the comparator 10 (see FIG. 1). The OR circuit 45 performs a logical OR operation with the respective output signals from the AND circuits 43 and 44 as well as the signal from the comparator 10 to generate a signal S7 indicating the result of the logical operation. For example, the OR circuit 45 generates the H-level signal S7 (reset signal) when any one of these three input signals is at the H level. Further, the OR circuit 45 generates the L-level signal S7 when these three input signals are all at the L level. The signal S7 is supplied to the D-FF circuit 46 at its reset terminal.

The D-FF circuit 46 is supplied at its input terminal (i.e., data terminal) with the high-potential power supply voltage VDD. Further, the D-FF circuit 46 is supplied with the synchronization pulse signal PL at its inverting clock terminal. The D-FF circuit 46 provides an output signal having the level of the power supply voltage VDD input to the data terminal, that is, the H level in synchronization with a trailing edge of the synchronization pulse signal PL. Therefore, the D-FF circuit 46 supplies the H-level output signal to the AND circuits 43 and 44 when the synchronization transistor T2 is inactivated.

In this case, when the H-level signal S5 is output from the comparator 41 (the inactivation timing of the transistor T2 is delayed), the AND circuit 43 provides the H-level output signal. When the H-level signal S6 is output from the comparator 42 (the inactivation timing of the transistor T2 is advanced), the AND circuit 44 provides the H-level output signal. Further, when the feedback voltage VFB becomes lower than the reference voltage Vr, the comparator 10 provides an H-level signal S1. In any of those cases, the OR circuit 45 outputs the H-level signal S7. In response to the H-level signal S1 (reset signal), the D-FF circuit 46 supplies the L-level output signal to the AND circuits 43 and 44. Then, irrespective of the signals S5 and S6 from the comparators 41 and 42, the AND circuits 43 and 44 provide the L-level output signal. That is, in this case, the AND circuits 43 and 44 function as an invalidation circuit that invalidates the respective signals S5 and S6 from the comparators 41 and 42.

The one-shot circuit 47 generates a control signal S8 that takes on the H level during a fixed period in response to the H-level output signal output from the AND circuit 43 and supplies the control signal S8 to the switch SW1. The one-shot circuit 48 generates a control signal S9 that takes on the H level during the fixed period in response to the H-level output signal output from the AND circuit 44 and supplies the control signal S9 to the switch SW2.

In the first embodiment, the comparators 41 and 42, the AND circuits 43 and 44, the OR circuit 45, the D-FF circuit 46, and the one-shot circuits 47 and 48 function as a detection circuit that generates the control signals S8 and S9 corresponding to a magnitude relation between the voltage VLX and the reference values (first and second reference voltages Vr1 and Vr2), that is, a result of comparison between the voltage VLX and the reference voltages Vr1 and Vr2.

The switch SW1 has its first terminal coupled to a first terminal of the current supply A1 and its second terminal of the switch SW1 coupled to a first terminal of the switch SW2. The current supply A1 is supplied with the bias voltage VB at its second terminal. The switch SW2 has its second terminal coupled to a first terminal of the current supply A2, a second terminal of which current source A2 is coupled to the ground. The switch SW1 is activated in response to the H-level control signal S8 and inactivated in response to the L-level control signal S8. Further, the switch SW2 is activated in response to the H-level control signal S9 and inactivated in response to the L-level control signal S9. A node N4 between the switches SW1 and SW2 is coupled to a first terminal of the capacitor C41, a second terminal of which capacitor C41 is coupled to the ground. Further, the node N4 is coupled to a non-inverting input terminal of the transconductance amplifier (gm amplifier) 49. The current supplies A1 and A2 flow the respective given currents.

The gm amplifier 49 is supplied with a reference voltage Vr3 at its inverting input terminal. The gm amplifier 49 has its output terminal coupled to the node N3 of the aforesaid synchronization timer 30. The gm amplifier 49 supplies the synchronization timer 30's node N3 with a current signal corresponding to a difference in potential between a voltage VN4 at the first terminal (aforesaid node N4) of the capacitor C41 and the reference voltage Vr3 as the regulation signal SG1.

In the first embodiment, the switches SW1 and SW2, the current supplies A1 and A2, the capacitor C41, and the gm amplifier 49 function as a regulation circuit that regulates the activated period (switching timing) of the transistor T2 in such a manner as to reduce the difference between the voltage VLX and the first and second reference voltages Vr1 and Vr2.

In the synchronization rectification period regulation circuit 40 configured in such a manner, the comparator 41 outputs the H-level signal S5 when the voltage VLX at the node LX at a time when the synchronization transistor T2 is inactivated is higher than the first reference voltage Vr1. Correspondingly, the one-shot circuit 47 outputs the H-level control signal S8 (one-shot pulse) so that the switch SW1 is activated to charge the capacitor C41 with a current flowed by the current supply A1. Accordingly, the voltage VN4 at the first terminal (aforesaid node N4) of the capacitor C41 rises corresponding to the current flowed by the current supply A1. In this case, when the voltage VN4 becomes higher than the reference voltage Vr3, the value of a current of the regulation signal SG1 emitted from the gm amplifier 49 increases. Then, the current Ic1 flowing through the capacitor C31 in the synchronization timer 30 increases so that the voltage VN3 at the node N3 rises steeply. This advances a timing at which the H-level signal S3 (reset signal) is output from the operational amplifier 32 so that the inactivation timing of the synchronization transistor T2 may be advanced.

The comparator 42 outputs the H-level signal S6 when the voltage VLX at the node LX at the time when the synchronization transistor T2 is inactivated is lower than the second reference voltage Vr2. Correspondingly, the one-shot circuit 48 outputs the H-level control signal S9 (one-shot pulse) so that the switch SW2 is activated to release charge accumulated in the capacitor C41 corresponding to a current flowed by the current supply A2. Accordingly, the voltage VN4 at the first terminal (aforesaid node N4) of the capacitor C41 falls corresponding to the current flowed by the current supply A2. In this case, when the voltage VN4 becomes lower than the reference voltage Vr3, the value of the current of the regulation signal SG1 flowing into the gm amplifier 49 increases. Then, the current Ic1 flowing through the capacitor C31 in the synchronization timer 30 decreases, so that the voltage VN3 at the node N3 rises moderately. This delays the timing at which the H-level signal S3 (reset signal) is output from the operational amplifier 32, so that the inactivation timing of the synchronization transistor T2 may be delayed.

Figure 7:
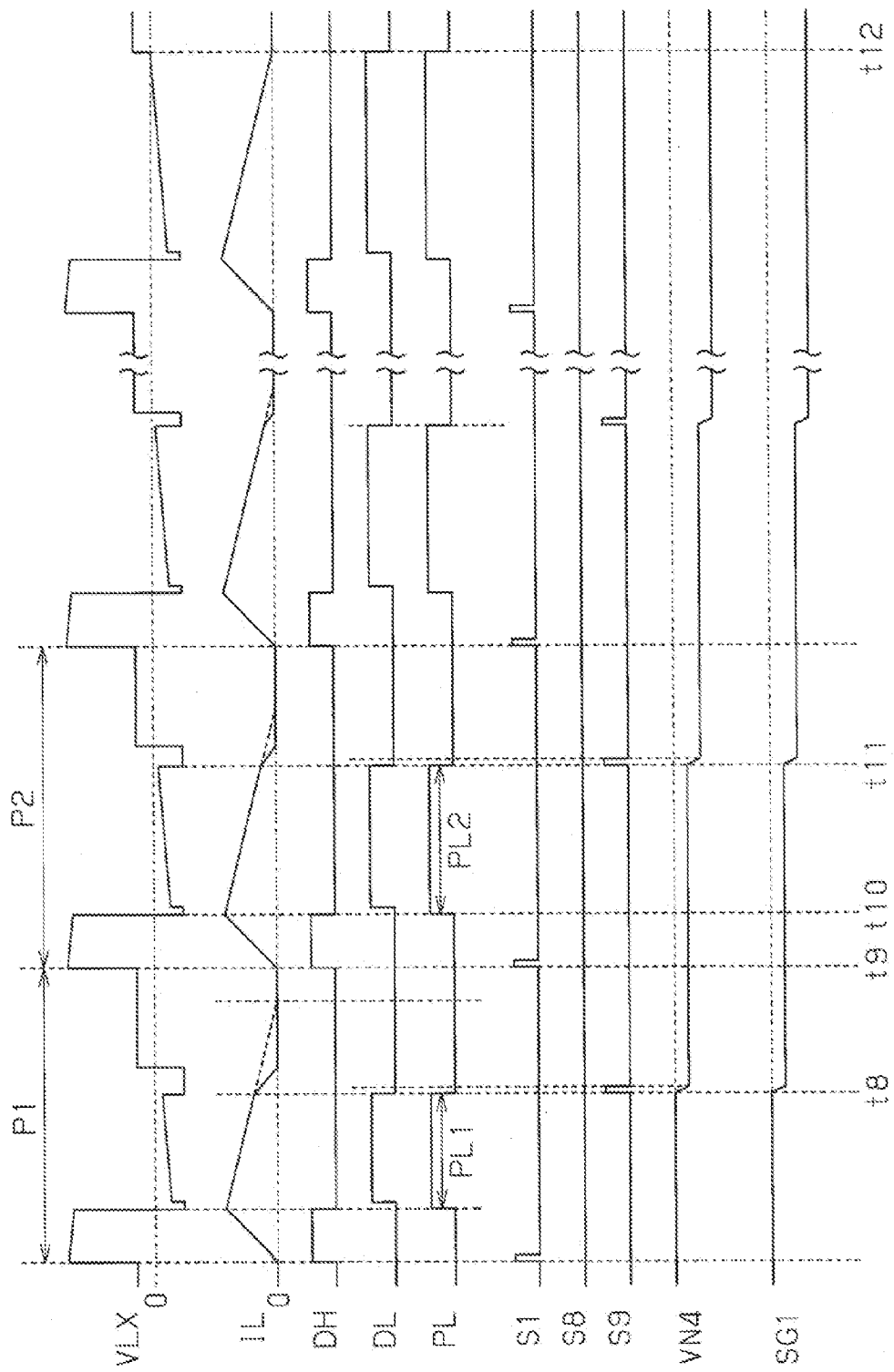
FIG. 7 is a waveform chart schematically illustrating the operations of the DC-DC converter in FIG. 1.
Figure 8:
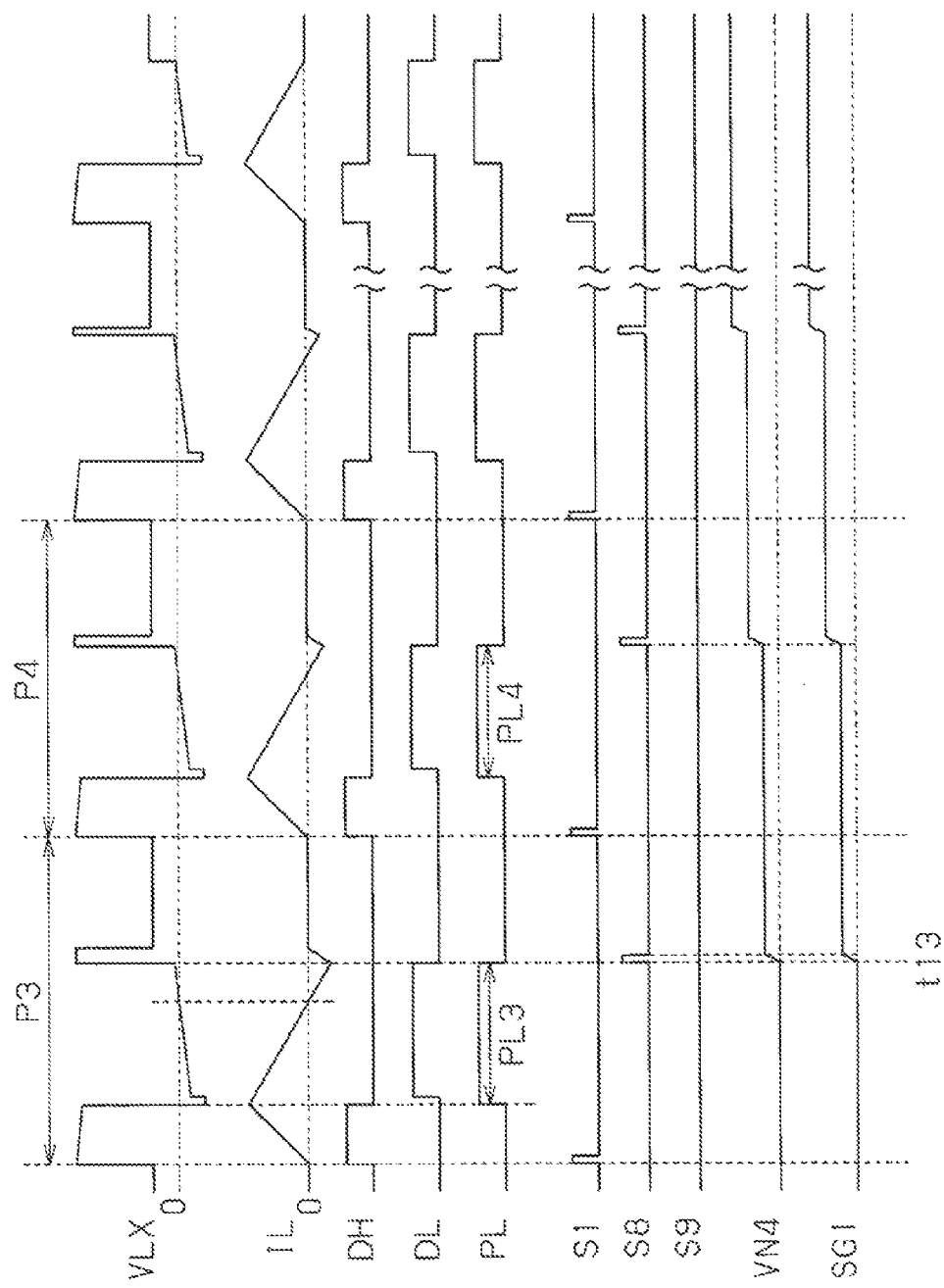
FIG. 8 is a waveform chart schematically illustrating the operations of the DC-DC converter in FIG. 1.

Operations of the DC-DC converter 1 will now be described with reference to FIGS. 6 to 8. The horizontal and vertical axes in FIGS. 6 to 8 are decreased or increased in scale to facilitate illustration.

First, a description will be given of the operations of the DC-DC converter 1 when the load is large and the peak value of the output current Io is thus high (for example, in the continuous current mode (CCM)).

When the feedback voltage VFB becomes lower than the reference voltage Vr at a time t0, the comparator 10 outputs the H-level signal S1. In response to the H-level signal S1, the main timer 20 outputs the H-level main pulse signal PH and the synchronization timer 30 outputs the L-level synchronization pulse signal PL. Subsequently, the control signal DL shifts from the H level to the L level in response to the L-level synchronization pulse signal PL, and then the control signal DH shifts from the L level to the H level in response to the H-level main pulse signal PH (time t1). Then, the main transistor T1 is activated in response to the H-level control signal DH, while the synchronization transistor T2 is inactivated in response to the L-level control signal DL. As a result, a current path is formed which goes from the input voltage Vi through the coil L1 up to the output terminal Po, so that the coil current IL flowing through the coil L1 increases to accumulate energy in the coil L1. Accordingly, the output voltage Vo (feedback voltage VFB) rises gradually (times t1 to t2).

Next, when a given time elapses after the H-level signal S1 is output, the L-level main pulse signal PH is output from the main timer 20 (time t2). In response to the L-level main pulse signal PH, the L-level control signal DH is output along with the H-level synchronization pulse signal PL. Then, in response to the H-level synchronization pulse signal PL, the H-level control signal DL is output. In this case, the main transistor T1 is inactivated in response to the L-level control signal DH, while the synchronization transistor T2 is activated in response to the H-level control signal DL. Then, a current path from the ground to the output terminal Po is formed, so that the coil current IL flowing through this current path decreases, to release the energy accumulated in the coil L1 toward the output terminal Po. Accordingly, the output voltage Vo (feedback voltage VFB) decreases gradually. As a result, when the feedback voltage VFB becomes lower than the reference voltage Vr (time t3), again the main transistor T1 is activated and the synchronization transistor T2 is inactivated.

In such a continuous current mode, the inactivation period Toff of the main transistor T1 is roughly equal to an activated period Ts2 of the synchronization transistor T2 as illustrated in FIG. 6. As described above, the inactivation period Toff of the transistor T1 may be expressed as:

Equation 10
$$Toff = \frac{Vi - Vo}{Vi} \times T \quad (10)$$

and further, Equation (6) may be used to express it as:

Equation 11
$$Toff = \frac{Vi - Vo}{Vi} \times To \quad (11)$$

Therefore, the activated period Ts2 of the synchronization transistor T2 is given by:

Equation 12
$$Ts2 \approx \frac{Vi - Vo}{Vi} = To = Ts1 \quad (12)$$

As may be clear from Equation (12), the activated period Ts2 of the synchronization transistor T2 is roughly equal to the period Ts1 from a time when the synchronization pulse signal PL has risen to the H level to a time when the H-level signal S3 is output (see Equation (9)).

The operations of the DC-DC converter 1 when the load is small and the peak value of the output current Io is thus low (for example, in the discontinuous current mode (DCM)) will now be described.

When the feedback voltage VFB becomes lower than the reference voltage Vr at a time t4, the comparator 10 outputs the H-level signal S1. In response to the H-level signal S1, the main transistor T1 is activated and the synchronization transistor T2 is inactivated in the same manner as when the load is large. When the transistor T1 is activated, the coil current IL increases gradually to increase the output voltage Vo gradually. Next, when a given time elapses after the H-level signal S1 is output, the L-level main pulse signal PH is output from the main timer 20 (time t5). In response to the L-level main pulse signal PH, the main transistor T1 is inactivated and the synchronization transistor T2 is activated in the same manner as when the load is large. When the transistor T1 is inactivated, the coil current IL decreases gradually to decreases the output voltage Vo gradually.

Next, when a given period Ts3 elapses after the L-level main pulse signal PH is output, the L-level synchronization pulse signal PL is output from the synchronization timer 30 (time t6). In response to the L-level synchronization pulse signal PL, the synchronization transistor T2 is inactivated. With this, the synchronization transistor T2 is inactivated during the inactivation period of the main transistor T1. That is, both of the transistors T1 and T2 are inactivated. Accordingly, the coil current IL is maintained at 0 A so that it may change discontinuously (discontinuous current mode). Then, when the feedback voltage VFB becomes lower than the reference voltage Vr (time t7), the main transistor T1 is activated again. The synchronization pulse signal PL is maintained at the L level until the main pulse signal PH falls in potential.

In such a manner, in the discontinuous current mode, the synchronization transistor T2 is kept in the activated state for the given period Ts3 when the main transistor T1 is being in the inactivated state. The given period Ts3 is set with respect to the period Ts1 from the time when the synchronization pulse signal PL has risen to the H level to the time when the H-level signal S3 (see FIG. 3) is output. Further, as described above, the activated period Ts2 of the transistor T2 in the continuous current mode is also roughly equal to the aforesaid period Ts1. Accordingly, the activated period Ts2 of the transistor T2 in the continuous current mode is roughly equal to the activated period Ts3 of the transistor T2 in the discontinuous current mode. Thus, even when the load suddenly becomes small, the activated period (i.e., inactivation timing) of the transistor T2 may be optimized based on the period Ts1 by finely regulating the period Ts1 (activated period Ts2 in the high load mode). Therefore, it is possible to optimize the inactivation timing of the synchronization transistor T2 soon after a sudden change in the load.

The operations of the DC-DC converter 1 for finely regulating the activated period (inactivation timing) of the transistor T2 with the regulation circuit 40 will now be described with reference to FIGS. 7 and 8.

First, the operations when the inactivation timing of the transistor T2 is advanced will be described with reference to FIG. 7.

Now, when the L-level synchronization pulse signal PL is output at a time t8, in response to this L-level synchronization pulse signal PL, the L-level control signal DL is output. This causes the synchronization transistor T2 is to be inactivated. In this case, the voltage VLX at the node LX between the transistors T1 and T2 is lower than the second reference voltage Vr2. Therefore, the H-level signal S6 is output from the comparator 42 in the regulation circuit 40. In such a case where the voltage VLX is lower than the second reference voltage Vr2 (negative potential), as described above, the inactivation timing of the transistor T2 is advanced, that is, the activated period of the transistor T2 is insufficient in length. Then, operations described below will be performed to make an adjustment in such a manner as to delay the inactivation timing of the transistor T2, that is, to elongate its activated period in a cycle P2 next to the present cycle P1.

When the H-level signal S6 is output, the H-level control signal S9 is output from the one-shot circuit 48 to activate the switch SW2. Therefore, charge accumulated in the capacitor C41 is released according to a current flowed by the current supply A2. That is, the voltage VN4 at the first terminal (node N4) of the capacitor C41 falls corresponding to the current flowed by the current supply A2. Accordingly, the value of a current of the regulation signal SG1 output from the gm amplifier 49 decreases as illustrated in FIG. 7. In other words, when the voltage VN4 becomes lower than the reference voltage Vr3, the value of a current of the regulation signal SG1 flowing into the gm amplifier 49 increases. The regulation signal SG1 set in the cycle P1 is utilized when setting the activated period (inactivation timing) of the transistor T2 in the next cycle P2.

Afterward, when the feedback voltage VFB becomes lower than the reference voltage Vr at a time t9, the H-level signal S1 is output from the comparator 10. In response to the H-level signal S1, the transistor T1 is activated and the transistor T2 is inactivated. Subsequently, at a time t10 when a given period has elapsed since output of the H-level signal S1, the L-level main pulse signal PH is output. Then, in response to the L-level main pulse signal PH, the L-level control signal DH is output. Further, in response to the L-level main pulse signal PH, the H-level synchronization pulse signal PL and the L-level inverted signal PLx are output. With this, the capacitor C31 in the synchronization timer 30 starts to be charged at the time t10. In this case, the regulation signal SG1 set in the previous cycle P1 is to flow into the gm amplifier 49. Therefore, assuming the value of a current of the regulation signal SG1 to be Isg, the current Ic1 which flows through the capacitor C31 is given by:

Equation 13

$$Ic1 = I31 - Isg \quad (13)$$

Therefore, the current Ic1 becomes smaller in value than in the case of Isg=0 (no regulation). As a result, the voltage VN3 at the node N3 rises moderately. This delays a timing at which the H-level signal S3 (reset signal) is output from the operational amplifier 32, so that a timing at which the synchronization pulse signal PL falls is retarded from the previous cycle P1. That is, a period from the time t10 to a time t11 when the synchronization pulse signal PL falls, that is, a pulse width PL2 of the synchronization pulse signal PL (activated period of the transistor T2) becomes longer than a pulse width PL1 of the synchronization pulse signal PL in the previous cycle P1. In other words, the inactivation timing of the synchronization transistor T2 may be retarded from the previous cycle.

In the example of FIG. 7, the voltage VLX at the node LX at the time t11 is lower than the second reference voltage Vr2, so that the aforesaid operations are repeated again to optimize the inactivation timing of the transistor T2 at a time t12.

The operations performed when the inactivation timing of the transistor T2 is retarded will now be described with reference to FIG. 8.

Now, when the L-level synchronization pulse signal PL is output at a time t13, in response to this L-level synchronization pulse signal PL, the L-level control signal DL is output. This causes the synchronization transistor T2 is to be inactivated. In this case, the voltage VLX at the node LX between the transistors T1 and T2 is higher than the first reference voltage Vr1. Therefore, the H-level signal S5 is output from the comparator 41 in the regulation circuit 40. In such a case where the voltage VLX is higher than the first reference voltage Vr1 (positive potential), as described above, the inactivation timing of the transistor T2 is retarded, that is, the activated period of the transistor T2 is long. Then, operations described below will be performed to make an adjustment in such a manner as to advance the inactivation timing of the transistor T2, that is, to shorten its activated period in the next cycle P4, which follows the present cycle P3.

When the H-level signal S5 is output, the H-level control signal S8 is output from the one-shot circuit 47 to activate the switch SW1. Therefore, the capacitor C41 is charged with a current flowed by the current supply A1. That is, the voltage VN4 at the first terminal (node N4) of the capacitor C41 rises corresponding to the current flowed by the current supply A1. Accordingly, the value of a current of the regulation signal SG1 output from the gm amplifier 49 increases. In other words, when the voltage VN4 becomes higher than the reference voltage Vr3, the value of a current of the regulation signal SG1 emitted from the gm amplifier 49 increases. This increases the current Ic1 flowing to the capacitor C31 in the synchronization timer 30, so that the voltage VN3 at the node N3 rises steeply. Accordingly, the timing at which the H-level signal S3 (reset signal) is output from the operational amplifier 32 may be made earlier in the next cycle P4. For example, the pulse width PL4 of the synchronization pulse signal PL in the next cycle P4 may be made shorter than the pulse width PL3 of the synchronization pulse signal PL in the present cycle P3. In other words, the inactivation timing of the synchronization transistor T2 may be made earlier in the next cycle P4.

By repeating the operations described above with reference to FIGS. 7 and 8, the activated period (inactivation timing) of the transistor T2 may be optimized.

As described above, the DC-DC converter 1 in the first embodiment has the following advantages.

(1) Based on a magnitude relation between the voltage VLX at the node LX and the first and second reference voltages Vr1 and Vr2 at a time when the synchronization transistor T2 is inactivated, the inactivation timing of the transistor T2 is regulated in such a manner as to reduce a difference between the voltage VLX and the reference voltages Vr1 and Vr2. With this, it is possible to regulate the inactivation timing (activated period) of the transistor T2 based on determination of a result of comparison between the voltage VLX and the first and second reference voltages Vr1 and Vr2 at a time when the synchronization transistor T2 is inactivated. This eliminates the necessity in the conventional techniques to balance the quantity of charging the capacitor and the quantity of discharging the capacitor, so that it is possible to eliminate an offset time inherent to the conventional techniques. That is, in the DC-DC converter 1 in the first embodiment, it is possible to inactivate the transistor T2 at a timing when the coil current IL decreases to 0 A (or a timing as close as to that timing). Therefore, a conversion efficiency of the DC-DC converter 1 may be improved.

Further, a configuration to detect a reverse flow of the coil current IL is not necessary, so that it is possible to prevent occurrence of a problem in that the conversion efficiency of the DC-DC converter deteriorates due to process variations, etc. in the configuration.

Moreover, even when the process variations or the like occur in the circuit configuration of the synchronization rectification regulation circuit 40 etc., the inactivation timing of the transistor T2 is optimized in condition where those variations or the like have occurred. Therefore, it is possible to suitably inhibit a decrease in conversion efficiency owing to those variations etc.

(2) Based on whether the voltage VLX at a time when the transistor T2 is inactivated is a positive potential or a negative potential, the inactivation timing of the transistor is regulated in such a manner as to reduce this voltage VLX to 0 V. For example, when the voltage VLX during activation of the transistor T2 is a positive potential, the inactivation timing of the transistor T2 is retarded. Therefore, in this case, an adjustment is made to advance the inactivation timing of the transistor T2 (lower the voltage VLX). When the voltage VLX at the time when the transistor T2 is inactivated is a negative potential, the inactivation timing of the transistor T2 is advanced. Therefore, in this case, an adjustment is made to delay the inactivation timing of the transistor T2 (raise the voltage VLX). By performing such operations, the transistor T2 is inactivated at a timing when the coil current IL decreases to 0 A so that the voltage VLX may be reduced to 0 V when the transistor T2 is inactivated. Therefore, through those operations, the inactivation timings of the transistor T2 may be converged to an optimal timing.

(3) There are provided the main timer 20 that generates the main pulse signal PH setting the activated period of the main transistor T1, the synchronization timer 30 that generates the synchronization pulse signal PL setting the activated period of the synchronization transistor T2, and the regulation circuit 40 that regulates the pulse width of the synchronization pulse signal PL. In this configuration, the activated period of the main transistor T1 is set to a fixed period by the main pulse signal PH. Accordingly, the inactivation timing of the transistor T2 is optimized by finely regulating the period Ts1 set by the synchronization timer 30 irrespective of a sudden change in the load or the like. Therefore, even when the load suddenly becomes small, the inactivation timing of the transistor T2 may be optimized soon after the sudden change in the load.

The first embodiment may be modified as described below.

Figure 9:
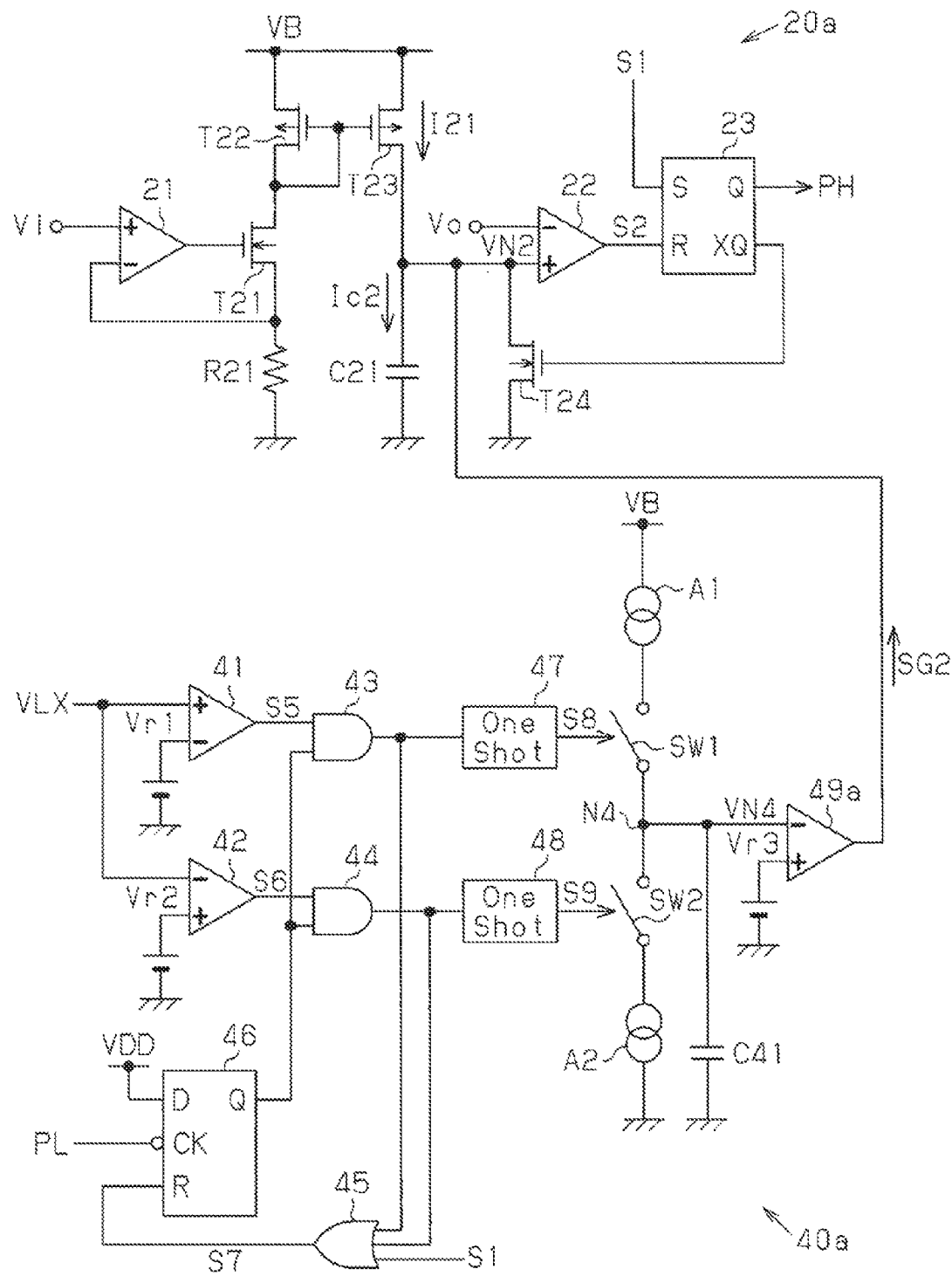
FIG. 9 is a circuit diagram illustrating a modification of the main timer and the synchronous rectification period regulation circuit in FIG. 1.
Figure 10:
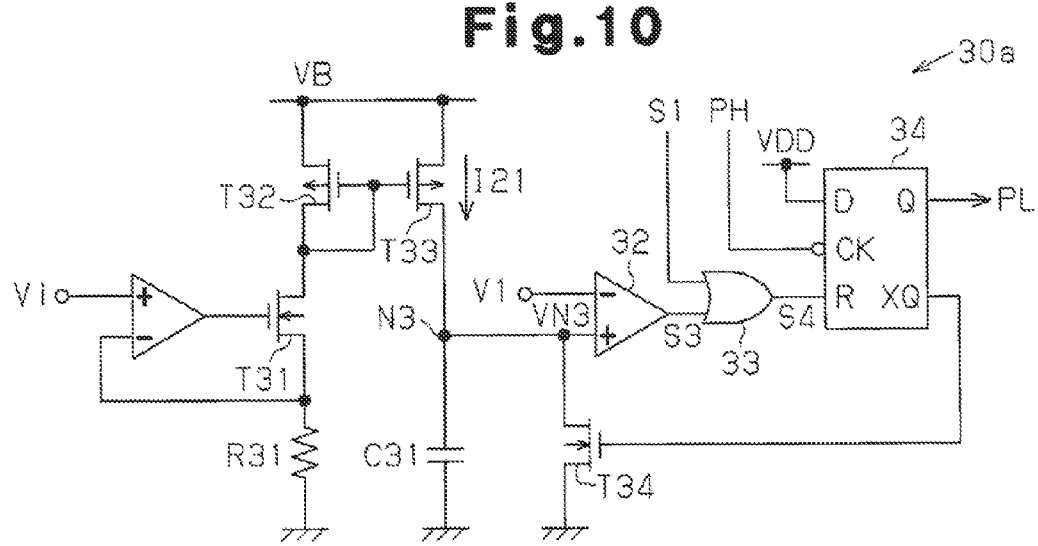
FIG. 10 is a circuit diagram illustrating a modification of the synchronization timer in FIG. 1.

In the first embodiment, the inactivation timing of the transistor T2 is optimized by regulating the activated period of the transistor T2 based on the magnitude relation between the voltage VLX at the node LX and the first and second reference voltages Vr1 and Vr2 at a time when the synchronization transistor T2 is inactivated. Besides this, the inactivation timing of the transistor T2 may be optimized by regulating the activated period of the transistor T1 based on the magnitude relation between the voltage VLX at the node LX and the first and second reference voltages Vr1 and Vr2 at a time when the synchronization transistor T2 is inactivated, for example. In this case, for example, the main timer 20, the synchronization timer 30, and the regulation circuit 40 may be replaced with a main timer 20a, a synchronization timer 30a, and a regulation circuit 40a respectively illustrated in FIGS. 9 and 10. That is, in the present modification, an output terminal of a gm amplifier 49a in the regulation circuit 40a is coupled not to the node N3 of the synchronization timer 30a but to the node N2 of the main timer 20a. For example, the gm amplifier 49a is supplied at its inverting input terminal with the voltage VN4 at the node N4 between the switches SW1 and SW2. Further, the gm amplifier 49a is supplied at its non-inverting input terminal with the reference voltage Vr3. The gm amplifier 49a supplies a current signal corresponding to a difference in potential between the voltage VN4 at the node N4 and the reference voltage Vr3 to the node N2 of the main timer 20a as a regulation signal SG2.

Figure 11:
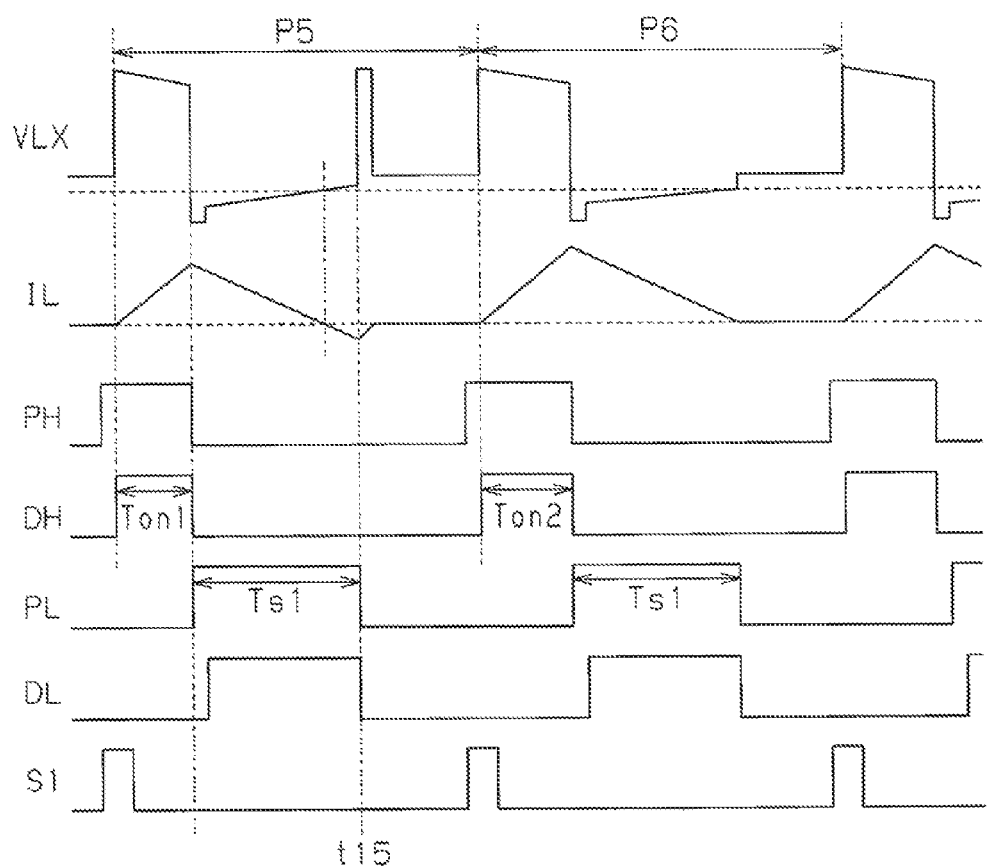
FIG. 11 is a waveform chart schematically illustrating the operations of the DC-DC converter based on the modifications in FIGS. 9 and 10.

In the main timer 20a and the synchronization rectification period regulation circuit 40a configured in such a manner, when the voltage VLX at the node LX at the time when the synchronization transistor T2 is inactivated is higher than the first reference voltage Vr1 (see a time t15 in FIG. 11), that is, the inactivation timing of the transistor T2 is retarded, the comparator 41 outputs the H-level signal S5. Correspondingly, the H-level control signal S8 is output from the one-shot circuit 47. This causes the switch SW1 to be activated, to charge the capacitor C41 with a current flowed by the current supply A1. In this case, when the voltage VN4 becomes higher than the reference voltage Vr3, the value of a current of the regulation signal SG2 flowing into the gm amplifier 49a increases. This causes a current flowing to the capacitor C21 in the main timer 20a to be decreased, so that the voltage VN2 at the node N2 rises moderately. With this, a timing is delayed at which the H-level signal S2 (reset signal) is output from the operational amplifier 22, to delay a timing at which the main pulse signal PH falls. As a result, the activated period Ton of the main transistor T1 is elongated from the present cycle P5 to the next cycle P6. For example, an activated period Ton2 of the transistor T2 in the next cycle P6 is longer than an activated period Ton1 of that in the present cycle P5. Accordingly, it is possible to approximate the voltage VLX at the time when the transistor T2 is inactivated to 0 V. That is, it is possible to approximate the inactivation timing of the synchronization transistor T2 to an optimal timing. In the discontinuous current mode, the pulse width (=aforesaid period Ts1) of the synchronization pulse signal PL generated by the synchronization timer 30a is fixed.

In the first embodiment and the modification, the main timers 20 and 20a have been configured to generate the main pulse signal PH that is held to the H level for a period that depends on the input voltage Vi and the output voltage Vo starting from a timing at which the signal S1 rises. The configurations of those main timers 20 and 20a may be changed appropriately. For example, the main timer 20 may be configured in such a manner as to generate the main pulse signal PH that is held to the H level for a fixed period.

The configurations of the synchronization timers 30 and 30a in the first embodiment and the modification may be changed appropriately.

The configurations of the synchronization rectification period regulation circuits 40 and 40a in the first embodiment and the modification may be changed appropriately.

Although the first embodiment has employed the DC-DC converter 1 of a comparator type, the present invention is not limited to it. For example, the DC-DC converter using an error amplifier, for example, may be employed.

Although the first embodiment has used the feedback voltage VFB by dividing the output voltage Vo generated using the resistors R1 and R2, the present invention is not limited to it. For example, the output voltage Vo itself may be used as the feedback voltage VFB.

Although the first embodiment has used an N-channel MOS transistor as one example of the switch circuit, a P-channel MOS transistor may be used instead. Further, a bipolar transistor may be used as the switch circuit. Alternatively, the switch circuit may be constituted of a plurality of transistors.

In the first embodiment, the transistors T1 and T2 may be included in the control circuit 3. Further, the converter unit 2 may be included in the control circuit 3.

Second Embodiment

A second embodiment will now be described with reference to FIGS. 12 to 16.

Figure 12:
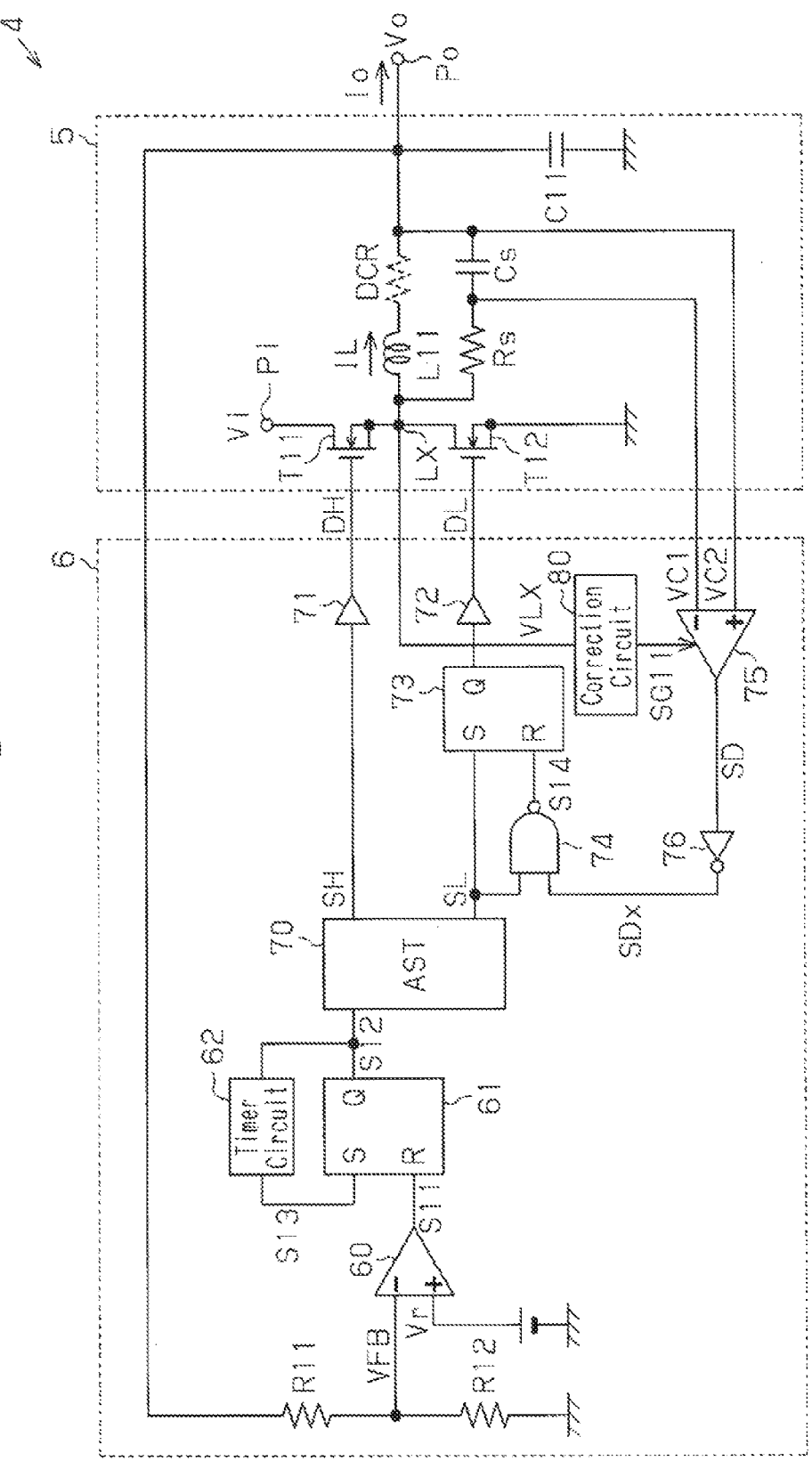
FIG. 12 is a block circuit diagram schematically illustrating a DC-DC converter in a second embodiment.

As illustrated in FIG. 12, a DC-DC converter 4 includes a converter unit 5, which generates an output voltage Vo based on an input voltage Vi, and a control circuit 6, which controls the converter unit 5.

The converter unit 5 includes a main transistor T11, a synchronization transistor T12, a coil L11, and a capacitor Cs.

The main transistor T11 and the synchronization transistor T12 are N-channel MOS transistors. The transistor T11 has a first terminal (drain) coupled to an input terminal Pi supplied with the input voltage Vi and a second terminal (source). The transistor T12 has a first terminal (drain) coupled to the second terminal of the transistor T11 and a power supply line (ground in this case) having a lower potential than the input voltage Vi. In such a manner, the transistors T11 and T12 are coupled in series between the input terminal Pi and the ground.

Further, the transistor T11 has a control terminal (gate) supplied with a control signal DH from the control circuit 6. Those transistors T11 and T12 are activated and inactivated in response to the control signals DH and DL, respectively. The control circuit 6 generates the control signals DH and DL in such a manner as to complementarily activate and inactivate the transistors T11 and T12. That is, the transistors T11 and T12 are one example of the switch circuit.

A node LX between those transistors T11 and T12 is coupled to a first terminal (input terminal) of the coil L11. A second terminal (output terminal) of the coil L11 is coupled to an output terminal Po that outputs the output voltage Vo. In such a manner, the transistor T11 and the coil L11 on the main side are coupled in series between the input terminal Pi and the output terminal Po.

Further, a first terminal of the coil L11 is coupled to a first terminal of a resistor Rs, a second terminal of which resistor Rs is coupled to a first terminal of a capacitor Cs. A second terminal of the capacitor Cs is coupled to a second terminal of the coil L11. In such a manner, the resistor Rs and the capacitor Cs are coupled in parallel with each other to the coil L11. A resistor coupled in series to the coil L11 is an equalization DC resistor DCR. A time constant of the resistor Rs and the capacitor Cs is set to be equal to that of the coil L11 and the equalization DC resistor DCR. Accordingly, by detecting a difference in potential between the terminals of the capacitor Cs, a drop in voltage of the equalization DC resistor DCR of the coil L11 may be detected spuriously, to detect a coil current IL flowing through the coil L11.

Further, the second terminal of the coil L11 is coupled to a first terminal of a smoothing capacitor C11, a second terminal of which capacitor C11 is coupled to the ground. The capacitor C11 is included in a smoothing circuit configured to smooth the output voltage Vo.

In such a converter unit 5, when the main transistor T11 is activated and the synchronization transistor T12 is inactivated, the coil current IL corresponding to a difference between the input voltage Vi and the output voltage Vo flows through the coil L11. This causes energy (power) to be accumulated in the coil L11. When the main transistor T11 is inactivated and the synchronization transistor T12 is activated, the coil L11 discharges the accumulated energy, so that an induction current (coil current IL) flows through the coil L11. Through such operations, the output voltage Vo which is stepped down from the input voltage Vi is generated. Then, the output voltage Vo is supplied to a load (not illustrated) coupled to the output terminal Po. Further, the load is supplied with an output current Io.

The control circuit 6 regulates pulse widths of the control signals DH and DL based on the output voltage Vo fed back from the converter unit 5. The control circuit 6 includes resistors R11 and R12, a comparator 60, an RS-FF circuit 61, a timer circuit 62, an anti-shoot-through (AST) 70, and driver circuits 71 and 72. Further, the control circuit 6 includes an RS-FF circuit 73, a NAND circuit 74, a reverse flow detection comparator 75 (reverse flow detection circuit), an inverter circuit 76, and a correction circuit 80.

The comparator 60 has an inverting input terminal supplied with a voltage corresponding to the output voltage Vo. In the second embodiment, a voltage generated through the resistors R11 and R12 is supplied to the inverting terminal of the comparator 60. For example, since the resistor R11 has its first terminal coupled to the output terminal Po, the output voltage Vo is fed back. Further, the resistor R11 has its second terminal coupled to a first terminal of the resistor R12, a second terminal of which resistor R12 is coupled to the ground. A node between the resistors R11 and R12 is coupled to a non-inverting input terminal of the comparator 60. The resistors R11 and R12 divide the output voltage Vo by a ratio of their resistance values, thereby generating a divided voltage (feedback voltage) VFB. A value of the feedback voltage VFB corresponds to a resistance value ratio between the resistors R11 and R12 as well as a difference in potential between the output voltage Vo and the ground. Accordingly, the resistors R11 and R12 generate the feedback voltage VFB proportional to the output voltage Vo.

The comparator 60 has a non-inverting input terminal supplied with a reference voltage Vr. The reference voltage Vr is set according to a target value of the output voltage Vo. The comparator 60 generates a signal S11 corresponding to a result of the comparison between the feedback voltage VFB and the reference voltage Vr. In the second embodiment, the comparator 60 generates the L-level signal S11 when the feedback voltage VFB is higher than the reference voltage Vr and the H-level signal S11 when the feedback voltage VFB is lower than the reference voltage Vr. The signal S11 is supplied to a reset terminal of the RS-FF circuit 61.

The RS-FF circuit 61 is supplied at its set terminal with a signal S13 from the timer circuit 62. The RS-FF circuit 61 outputs an H-level signal S12 in response to the H-level signal S11 and an L-level signal S12 in response to the H-level signal S13. That is, the H-level signal S11 functions as a set signal for the RS-FF circuit 61, and the H-level signal S13 functions as a reset signal for the RS-FF circuit 61. Further, the signal S12 output from the RS-FF circuit 61 is supplied to the timer circuit 62 and an AST 70.

In response to the H-level signal S12, the timer circuit 62 generates the pulse signal S13 set to the H level after a given period of time elapses since a timing at which this signal S12 rises. The given period depends on the input voltage Vi and the output voltage Vo, for example. That is, the timer circuit 62 outputs the H-level pulse signal S13 after the period depending on the input voltage Vi and the output voltage Vo elapses since the timing at which the output signal S12 rises.

The AST 70 generates control signals SH and SL based on the signal S12 output from the RS-FF circuit 61 so that the transistors T11 and that T12 in the converter unit 2 may be activated and inactivated in a complementary manner and may not be activated simultaneously. For example, the AST 70 generates the H-level control signal SH and the L-level control signal SL in response to the H-level signal S12. Further, the AST 70 generates the L-level control signal SH and the H-level control signal SL in response to the L-level signal S12. Then, the AST 70 supplies the control signal SH to the driver circuit 71 and the control signal SL to the RS-FF circuit 73 and the NAND circuit 74.

The driver circuit 71 supplies the H-level control signal DH to the main transistor T11 in response to the H-level control signal SH and the L-level control signal DH to the transistor T11 in response to the L-level control signal SH. The transistor T11 is activated in response to the H-level control signal DH and inactivated in response to the L-level control signal DH.

The RS-FF circuit 73 is supplied at its set terminal with the control signal SL from the AST 70. Further the RS-FF circuit 73 is supplied at its reset terminal with an output signal S14 from the NAND circuit 74.

The NAND circuit 74 is supplied with a detection signal SD output from the reverse flow detection comparator 75 through the inverter circuit 76 as an inverted signal SDx. The comparator 75 has an inverting input terminal coupled to a first terminal (node between the resistor Rs and the capacitor Cs) of the capacitor Cs in the converter unit 5 and a non-inverting input terminal coupled to a second terminal (node between the coil L11 and the capacitor Cs) of the capacitor Cs. The comparator 75 detects the coil current IL flowing through the coil L11 based on a difference in potential between a voltage VC1 of the first terminal and a voltage VC2 of the second terminal of the capacitor Cs and outputs the H-level or L-level detection signal SD corresponding to a result of the detection to the inverter circuit 76. For example, when the voltage VC1 is higher than the voltage VC2, that is, the coil current IL flows from the ground to the output terminal Po, the comparator 75 outputs the L-level detection signal SD configured to activate the synchronization transistor T12. Further, when the voltage VC1 is lower than the voltage VC2, that is, a reverse flow occurs from the output terminal Po to the ground, the comparator 75 outputs the H-level detection signal SD configured to activate the synchronization transistor T12.

The inverter circuit 76 outputs the L-level inverted signal SDx to the NAND circuit 74 in response to the H-level detection signal SD and H-level inverted signal SDx to the NAND circuit 74 in response to the L-level detection signal SD.

The NAND circuit 74 performs a logical NAND operation with the control signal SL and the inverted signal SDx from the inverter circuit 76 and supplies a signal S14 indicating the result of the logical operation to the reset terminal of the RS-FF circuit 73. For example, when the H-level detection signal SD is output from the comparator 75, the L-level inverted signal SDx is output from the inverter circuit 76. In this case, the NAND circuit 74 outputs the H-level signal S14 (reset signal) irrespective of the control signal SL.

The RS-FF circuit 73 outputs the H-level output signal in response to the H-level control signal SL and the L-level output signal in response to the H-level control signal S14. That is, the H-level control signal SL functions as the set signal and the H-level signal S14 functions as the reset signal on the RS-FF circuit 73. To describe it in more details, even in condition where the H-level control signal SL (set signal) is applied to the set terminal of the RS-FF circuit 73, when the H-level signal S14 (reset signal) is output from the NAND circuit 74 in response to the H-level detection signal SD output from the comparator 75, the RS-FF circuit 73 outputs the L-level output signal. That is, the reset operation (L-level output) is prioritized in the RS-FF circuit 73.

The driver circuit 72 supplies the H-level control signal DL to the synchronization transistor T12 in response to the H-level output signal from the RS-FF circuit 73. Further, the driver circuit 72 supplies the L-level control signal DL to the transistor T12 in response to the L-level output signal from the RS-FF circuit 73. The transistor T12 is activated in response to the H-level control signal DL and inactivated in response to the L-level control signal DL.

In the second embodiment, when the comparator 75 detects a reverse flow of the coil current IL to output the H-level detection signal SD, the L-level output signal is output from the RS-FF circuit 73 and the L-level control signal DL is output from the driver circuit 72. This causes the synchronization transistor T12 to be inactivated.

The correction circuit 80 is coupled to the node LX between the main transistor T11 and the synchronization transistor T12. The correction circuit 80 generates the correction signal SG1 configured to correct (optimize) a timing at which the comparator 75 detects a reverse flow, corresponding to the voltage VLX at the node LX when the synchronization transistor T12 is inactivated. For example, when the reverse flow detection timing is advanced, that is, the inactivation timing of the transistor T12 is advanced, a correction signal SG11 is generated which is configured to decrease the detection speed (operation speed) of the comparator 75. For example, when the H-level detection signal SD is output from the comparator 75 before the coil current IL flows reversely, the correction circuit 80 generates the correction signal SG11 so that the detection speed (operation speed) of the comparator 75 may be decreased. When the reverse flow detection timing is retarded, that is, the inactivation timing of the transistor T12 is retarded, the correction signal SG11 is generated which is configured to increase the detection speed (operation speed) of the comparator 75. For example, when the H-level detection signal SD is not output immediately from the comparator 75 after the coil current IL flows reversely, it generates the correction signal SG11 so that the detection speed (operation speed) of the comparator 75 may be increased.

In the second embodiment, the comparator 60 outputs the H-level signal S11 when the feedback voltage VFB corresponding to the output voltage Vo is lower than the reference voltage Vr. In response to the H-level signal S11, the RS-FF circuit 61 outputs the H-level signal S12. Then, in response to the H-level signal S12, the AST 70 generates the H-level control signal SH and the L-level control signal SL. Accordingly, the H-level control signal DH is output from the driver circuit 71 and the L-level control signal DL is output from the driver circuit 72. Therefore, when the feedback voltage VFB becomes lower than the reference voltage Vr (the feedback voltage VFB crosses the reference voltage Vr), the control circuit 6 activates the main transistor T11 and inactivates the synchronization transistor T12.

In response to the H-level signal S12, the timer circuit 62 outputs the H-level pulse signal S13 after a given period elapses since a timing at which the signal S12 rises. Then, in response to the H-level signal S13, the RS-FF circuit 61 outputs the L-level signal S12. In response to the L-level signal S12, the AST 70 generates the L-level control signal DH and the H-level control signal DL. Accordingly, the L-level control signal DH is output from the driver circuit 71 and the H-level control signal DL is output from the driver circuit 72. Therefore, the control circuit 6 inactivates the main transistor T11 and on the synchronization transistor T12 after a given period set by the timer circuit 62 elapses since a time when the main transistor T11 is activated. That is, the pulse width of the signal S12 output from the RS-FF circuit 61, that is, the activated period Ton of the main transistor T11 is determined by the timer circuit 62.

In such condition that the transistor T11 is inactivated and the transistor T12 is activated, when a reverse flow of the coil current IL is detected by the comparator 75 to output the H-level detection signal SD, the L-level control signal DL is output from the driver circuit 72. Then, the transistor T12 is inactivated. This causes the synchronization transistor T12 to be inactivated in a period when the main transistor T11 is in the inactivated state. That is, both of the transistors T11 and T12 in the converter unit 5 are inactivated.

One example of the timer circuit 62 will now be described with reference to FIG. 13.

Figure 13:
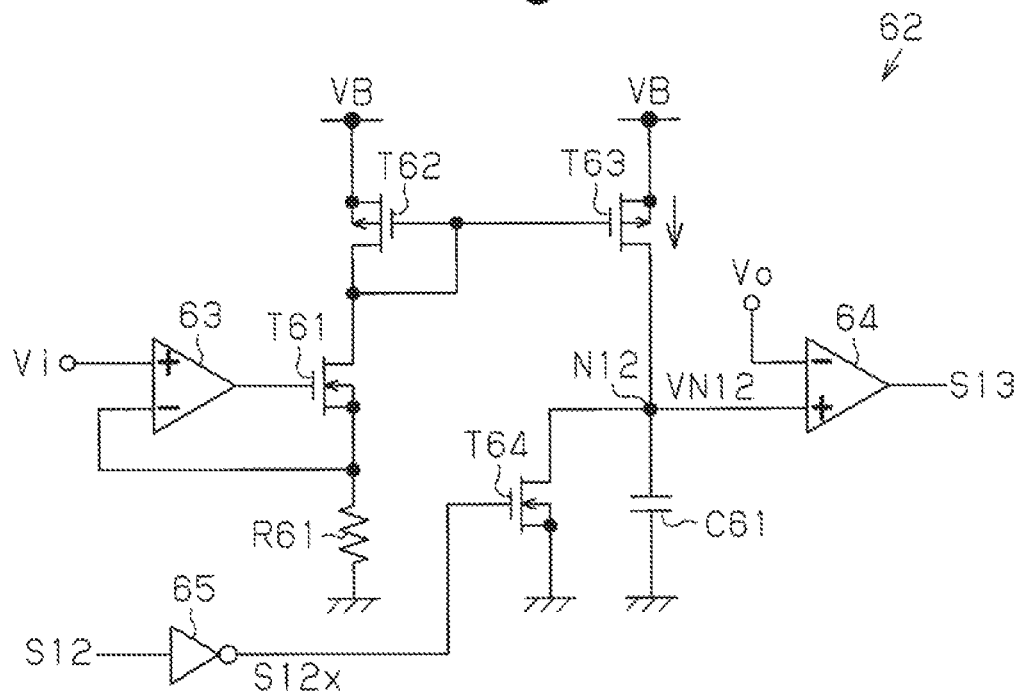
FIG. 13 is a circuit diagram illustrating an internal configuration example of a timer circuit in FIG. 12.

As illustrated in FIG. 13, the timer circuit 62 includes operational amplifiers 63 and 64, an inverter circuit 65, a capacitor C61, a resistor R61, and transistors T61 to T64.

The operational amplifier 63 is supplied with the input voltage Vi at its non-inverting input terminal. The operational amplifier 63 has its inverting input terminal coupled to a first terminal of the resistor R61. A second terminal of the resistor R61 is coupled to the ground. Further, the first terminal of the resistor R61 is coupled to a source of the N-channel MOS transistor T61. The transistor T61 has its gate coupled to an output terminal of the operational amplifier 63 and its drain coupled to a drain of the P-channel MOS transistor T62.

Between the first and second terminals of the resistor R61, a difference in potential occurs which corresponds to a current flowing through the resistor R61 and its resistance value. The operational amplifier 63 generates a gate voltage of the transistor T61 so that the potential of a node between the resistor R61 and the transistor T61 may be equal to the input voltage Vi. Therefore, the transistor T61 is supplied with a current corresponding to the input voltage Vi.

The transistor T62 is supplied with a bias voltage VB at its source. Further, the transistor T62 has its gate coupled to a drain of this transistor T62 and a gate of the P-channel MOS transistor T63. The bias voltage VB may as well be the input voltage Vi or generated by a power supply circuit not illustrated. The bias voltage VB is supplied also to a source of the transistor T63. Therefore, the transistors T62 and T63 are included in a current mirror circuit. The current mirror circuit supplies the transistor T63 with a current (which depends on the input voltage Vi) proportional to that flowing through the transistor T62 corresponding to electrical characteristics of each of the transistors T62 and T63.

The transistor T63 has its drain coupled to a first terminal of the capacitor C61 and a drain of the N-channel MOS transistor T64. A second terminal of the capacitor C61 and a source of the transistor T64 are coupled to the ground. In such a manner, the transistor T64 is coupled in parallel with the capacitor C61. The capacitor C61 is supplied by the transistor T63 with a current that depends on the input voltage Vi.

The transistor T64 is supplied at its gate with a signal S12x from an inverter circuit 65 that inverts the logic of the signal S12 output from the RS-FF circuit 61. As described above, when the signal S12 is at the H level, the main transistor T11 (see FIG. 12) is activated, while when the signal S12 is at the L level, the main transistor T11 is inactivated. In contrast, when the signal S12x is at the H level, that is, the signal S12 is at the L level (the transistor T11 is in the inactivated state), the transistor T64 is activated. When the transistor T64 is activated, the first and second terminals of the capacitor C61 are coupled to each other, so that a voltage VN12 at the first terminal (node N12) of the capacitor C61 is set to the ground level.

When the signal S12x is at the L level, that is, the signal S12 is at the H level (the transistor T11 is in the activated state), the transistor T64 is inactivated. When the transistor T64 is inactivated, the capacitor C61 is charged with a current supplied from the transistor T63. As a result, the voltage VN12 at the node N12 rises according to the input voltage Vi from the ground level. That is, the timer circuit 62 resets the voltage VN12 at the node N12 to the ground level by electrically short-circuiting the first and second terminals of the capacitor C61 when the main transistor T11 is in the inactivated state. Then, when the transistor T11 is activated, the timer circuit 62 starts charging the capacitor C61. As a result, voltage VN12 at the node N12 rises according to the input voltage Vi.

The node N12 is coupled to a non-inverting input terminal of the operational amplifier 64. Further, the operational amplifier 64 is supplied with the output voltage Vo at its inverting input terminal. The operational amplifier 64 generates the signal S13 corresponding to a result of comparison between the voltage VN12 at the node N12 and the output voltage Vo. For example, the operational amplifier 64 outputs the L-level signal S13 when the VN12 is lower than the output voltage Vo and the H-level signal S13 when the VN12 is higher than the output voltage Vo. As described above, when the main transistor T11 is activated, the voltage VN12 at the node N12 rises according to the input voltage Vi. Therefore, a period (activated period of the transistor T11) from a time when the transistor T11 is activated to a time when the H-level signal S13 is output depends on the input voltage Vi and the output voltage Vo.

One example of the correction circuit 80 will now be described with reference to FIG. 14.

Figure 14:
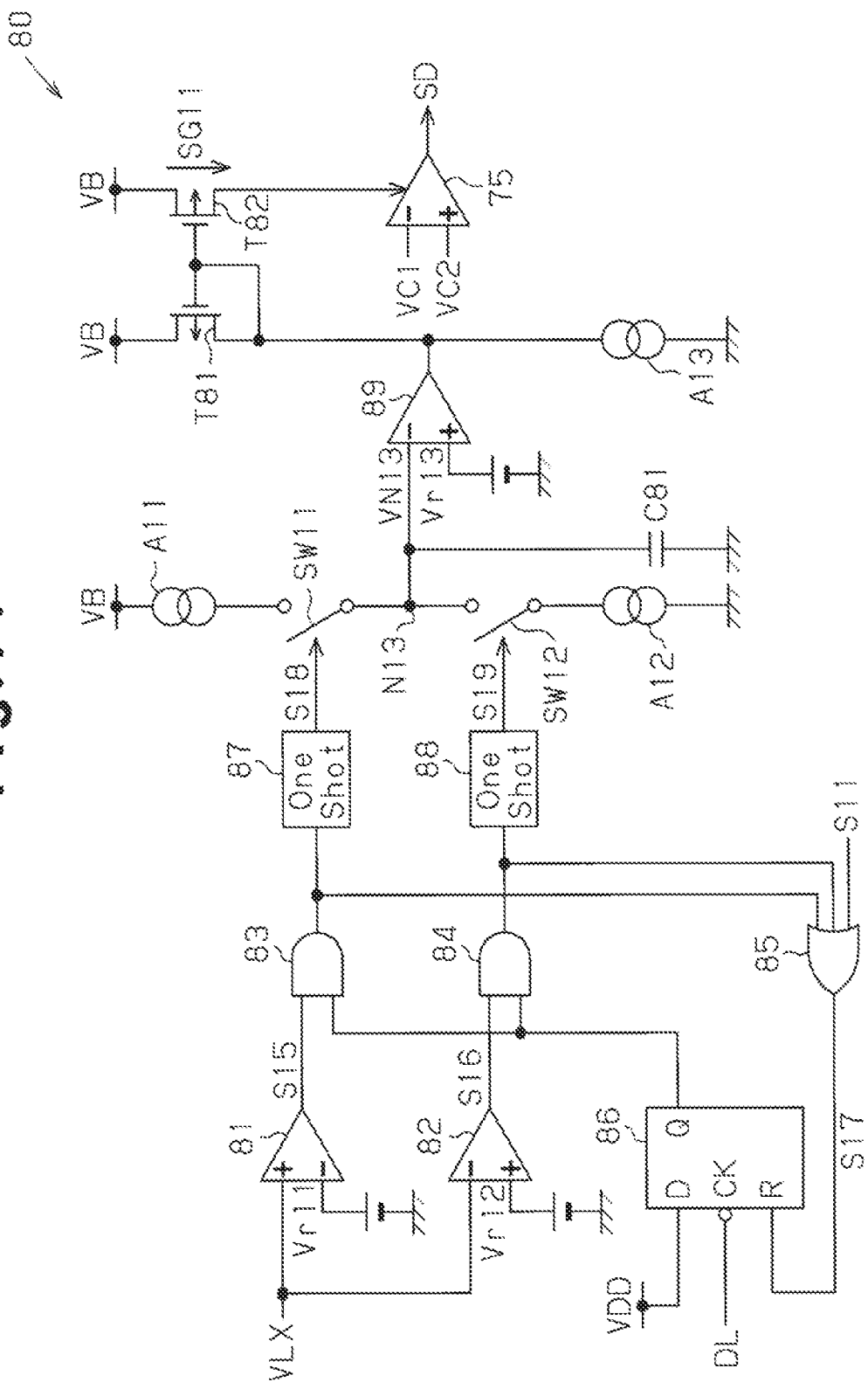
FIG. 14 is a block circuit diagram illustrating an internal configuration example of a correction circuit in FIG. 12.

As illustrated in FIG. 14, the correction circuit 80 includes comparators 81 and 82, AND circuits 83 and 84, an OR circuit 85, a D-FF circuit 86, one-shot circuits 87 and 88, switches SW11 and SW12, and current supplies A11, A12, and A13. Further, the correction circuit 80 includes a capacitor C81, a transconductance amplifier (gm amplifier) 89, and P-channel MOS transistors T81 and T82.

The comparator 81 is supplied at its non-inverting input terminal with the voltage VLX at the node LX between the transistors T11 and T12. Further, the comparator 81 is supplied at its inverting input terminal with a first reference voltage Vr11. The first reference voltage Vr1 is set to a positive potential (for example, +0.2 V). The comparator 81 generates a signal S15 corresponding to a result of comparison between the voltage VLX at the node LX and the first reference voltage Vr11 and supplies the signal S15 to the AND circuit 83. For example, the comparator 81 outputs the L-level signal S15 when the voltage VLX is lower than the first reference voltage Vr11 and the H-level signal S15 when the voltage VLX is higher than the first reference voltage Vr11. That is, the comparator 81 outputs the H-level signal S15 when the voltage VLX becomes higher than the first reference voltage Vr11 because the inactivation timing of the transistor T12 is retarded (reverse flow detection timing is retarded).

The comparator 82 is supplied also at its inverting input terminal with the voltage VLX at the node between the transistors T11 and T12. Further, the comparator 82 is supplied at its non-inverting input terminal with a second reference voltage Vr12. The second reference voltage Vr12 is set to a negative potential (for example, −0.2 V). The comparator 82 generates a signal S16 corresponding to a result of comparison between the voltage VLX at the node LX and the second reference voltage Vr12 and supplies the signal S16 to the AND circuit 84. For example, the comparator 82 outputs the L-level signal S16 when the voltage VLX is higher than the second reference voltage Vr12 and the H-level signal S16 when the voltage VLX is lower than the second reference voltage Vr12. That is, the comparator 82 outputs the H-level signal S16 when the voltage VLX becomes lower than the second reference voltage Vr12 because the inactivation timing of the transistor T12 is advanced (reverse flow detection timing is advanced).

The AND circuits 83 and 84 receive an output signal from the D-FF circuit 86. The AND circuit 83 performs a logical AND operation with the signal S15 from the comparator 81 and the output signal from the D-FF circuit 86 to generate an output signal indicating the result of the logical operation. The output signal from the AND circuit 83 is supplied to the OR circuit 85 and the one-shot circuit 87. The AND circuit 84 performs a logical AND operation with the signal S16 from the comparator 82 and the output signal from the D-FF circuit 86 to generate an output signal indicating the result of the logical operation. The output signal from the AND circuit 84 is supplied to the OR circuit 85 and the one-shot circuit 88.

The OR circuit 85 further receives also the signal S11 from the comparator 60 (see FIG. 12). The OR circuit 85 performs a logical OR operation with the respective output signals of the AND circuits 83 and 84 as well as the signal S11 from the comparator 60 to generate a signal S17 indicating the result of the logical operation. For example, the OR circuit 85 generates the H-level signal S17 (reset signal) when any one of these three input signals is at the H level. Further, the OR circuit 85 generates the L-level signal S17 when these three input signals are all at the L level. The signal S17 is supplied to the D-FF circuit 86 at its reset terminal.

The D-FF circuit 86 is supplied at its input terminal (i.e., data terminal) with a high-potential power supply voltage VDD. Further, the D-FF circuit 86 is supplied with the control signal DL at its inverting clock terminal. The D-FF circuit 86 provides an output signal having the level of the power supply voltage VDD input to the data terminal, that is, the H level in synchronization with a trailing edge of the control signal DL. Therefore, the D-FF circuit 86 supplies the H-level output signal to the AND circuits 83 and 84 when the synchronization transistor T12 is inactivated.

In this case, when the H-level signal S15 is output from the comparator 81 (the reverse flow detecting timing is retarded), the AND circuit 83 outputs the H-level output signal. When the H level signal S16 is output from the comparator 82 (the reverse flow detecting timing is advanced), the AND circuit 84 outputs the H-level output signal. Further, when the feedback voltage VFB becomes lower than the reference voltage Vr, the comparator 60 outputs the H-level signal S11. In any of those cases, the OR circuit 85 outputs the H-level signal S17. In response to the H-level signal S17 (reset signal), the D-FF circuit 86 supplies the L-level output signal to the AND circuits 83 and 84. Then, irrespective of the signals S15 and S16 from the comparators 81 and 82, the AND circuits 83 and 84 provide the L-level output signal. That is, in this case, the AND circuits 83 and 84 function as an invalidation circuit that invalidates the respective signals S15 and S16 from the comparators 81 and 82.

The one-shot circuit 87 generates a control signal S18 that takes on the H level during a fixed period in response to the H-level output signal output by the AND circuit 83 and supplies the control signal S18 to the switch SW11. The one-shot circuit 88 generates a control signal S19 that takes on the H level during the fixed period in response to the H-level output signal output by the AND circuit 84 and supplies the control signal S19 to the switch SW12.

In the second embodiment, the comparators 81 and 82, the AND circuits 83 and 84, the OR circuit 85, the D-FF circuit 86, and the one-shot circuits 87 and 88 function as a detection circuit that generates the control signals S18 and S19 corresponding to a magnitude relation between the voltage VLX and the reference values (first and second reference voltages Vr11 and Vr12), that is, a result of comparison between the voltage VLX and the reference voltages Vr11 and Vr12.

The switch SW11 has its first terminal coupled to a first terminal of the current supply A11 and its second terminal coupled to a first terminal of the switch SW12. The current supply A11 is supplied with the bias voltage VB at its second terminal. The switch SW12 has its second terminal coupled to a first terminal of the current supply A12, a second terminal of which current source A12 is coupled to the ground. The switch SW11 is activated in response to the H-level control signal S18 and inactivated in response to the L-level control signal S18. The switch SW12 is activated in response to the H-level control signal S19 and inactivated in response to the L-level control signal S19. A node N13 between the switches SW11 and SW12 is coupled to a first terminal of the capacitor C81, a second terminal of which capacitor C81 is coupled to the ground. Further, the node N13 is coupled to an inverting input terminal of the gm amplifier 89. The current supplies A11 and A12 give the respective given currents.

The gm amplifier 89 is supplied with a reference voltage Vr13 at its non-inverting input terminal. The gm amplifier 89 generates a current signal corresponding to a difference in potential between the voltage VN13 at the node N13 and the reference voltage Vr13. The gm amplifier 89 has its output terminal coupled to a first terminal of the current supply A13 and a drain of the transistor T81. The current supply A13 has its second terminal coupled to the ground. The current supply A13 gives a given current.

The transistor T81 is supplied with the bias voltage VB at its source. Further, the transistor T81 has its gate coupled to a drain of this transistor T81 and a gate of the transistor T82. The bias voltage VB is supplied also to a source of the transistor T82. Therefore, the transistors T81 and T82 are included in a current mirror circuit. The current mirror circuit supplies the transistor T82 with a current proportional to that flowing through the transistor T81 corresponding to electrical characteristics of each of the transistors T81 and T82. The current flowing through the transistor T82 is supplied as the correction signal SG11 to the comparator 75.

The correction signal SG1 is supplied to a differential input circuit, etc. in the comparator 75, for example. Then, in the comparator 75, an operation speed of the differential input circuit, etc. is changed corresponding to the quantity of a current of the correction signal SG11, thereby changing the operation speed of the comparator 75 as a whole. That is, when the current value of the correction signal SG1 increases, the operation speed of the comparator 75 increase, while when the current value of the correction signal SG1 decreases, the operation speed of the comparator 75 decrease.

In the second embodiment, the switches SW11 and SW12, the current supplies A11, A12, and A13, the capacitor C81, the gm amplifier 89, and the transistors T81 and T82 function as a correction circuit that corrects the operation speed of the comparator 75 so that a difference between the voltage VLX and the first and second reference voltages Vr11 and Vr12 may be reduced corresponding to the control signals S18 and S19. Further, in the second embodiment, the correction circuit and the reverse flow detection comparator 75 (reverse flow detection circuit) function as a regulation circuit that regulates a switching timing of the transistor T12 so that the difference may be reduced.

Figure 15:
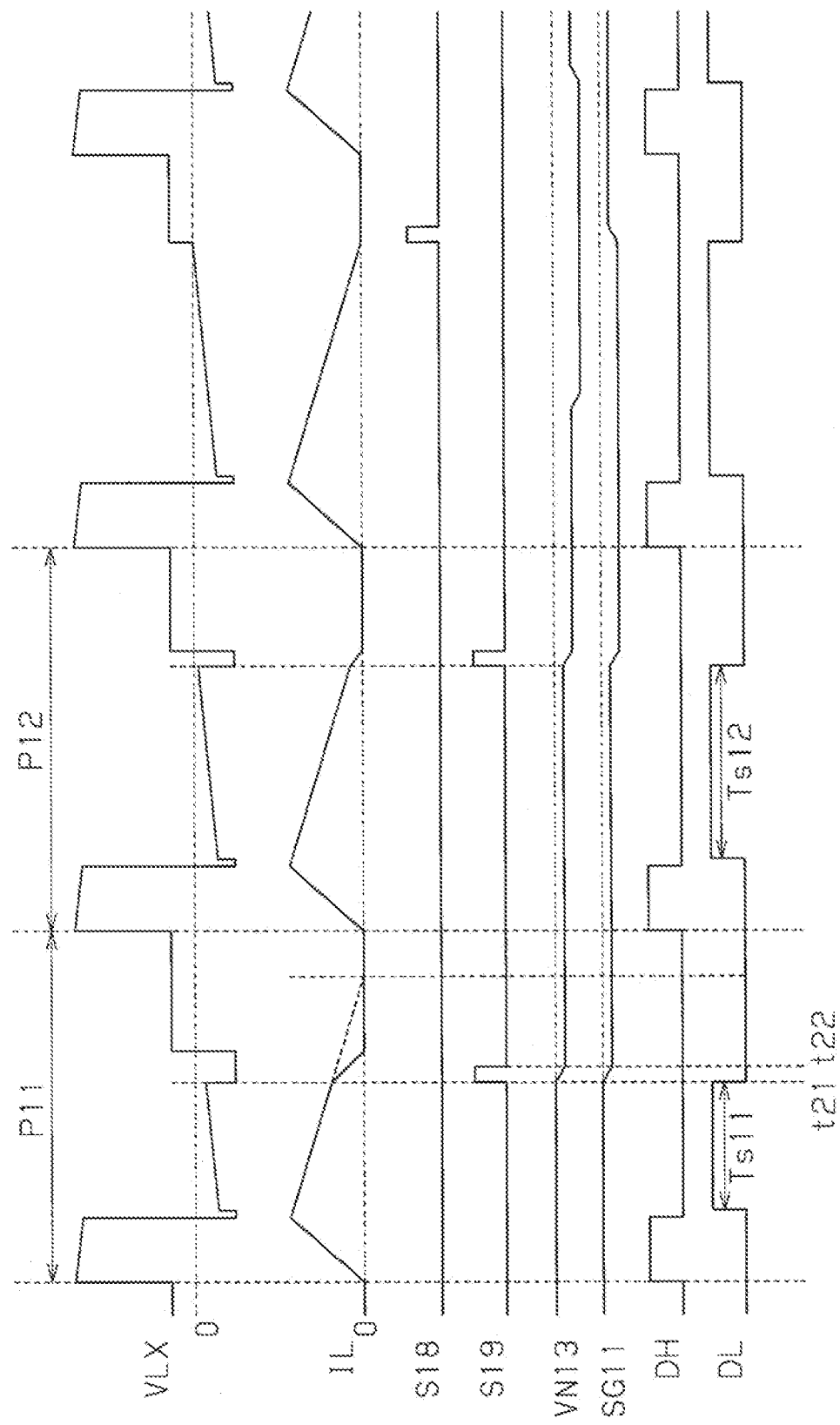
FIG. 15 is a waveform chart schematically illustrating operations of the DC-DC converter in the second embodiment.
Figure 16:
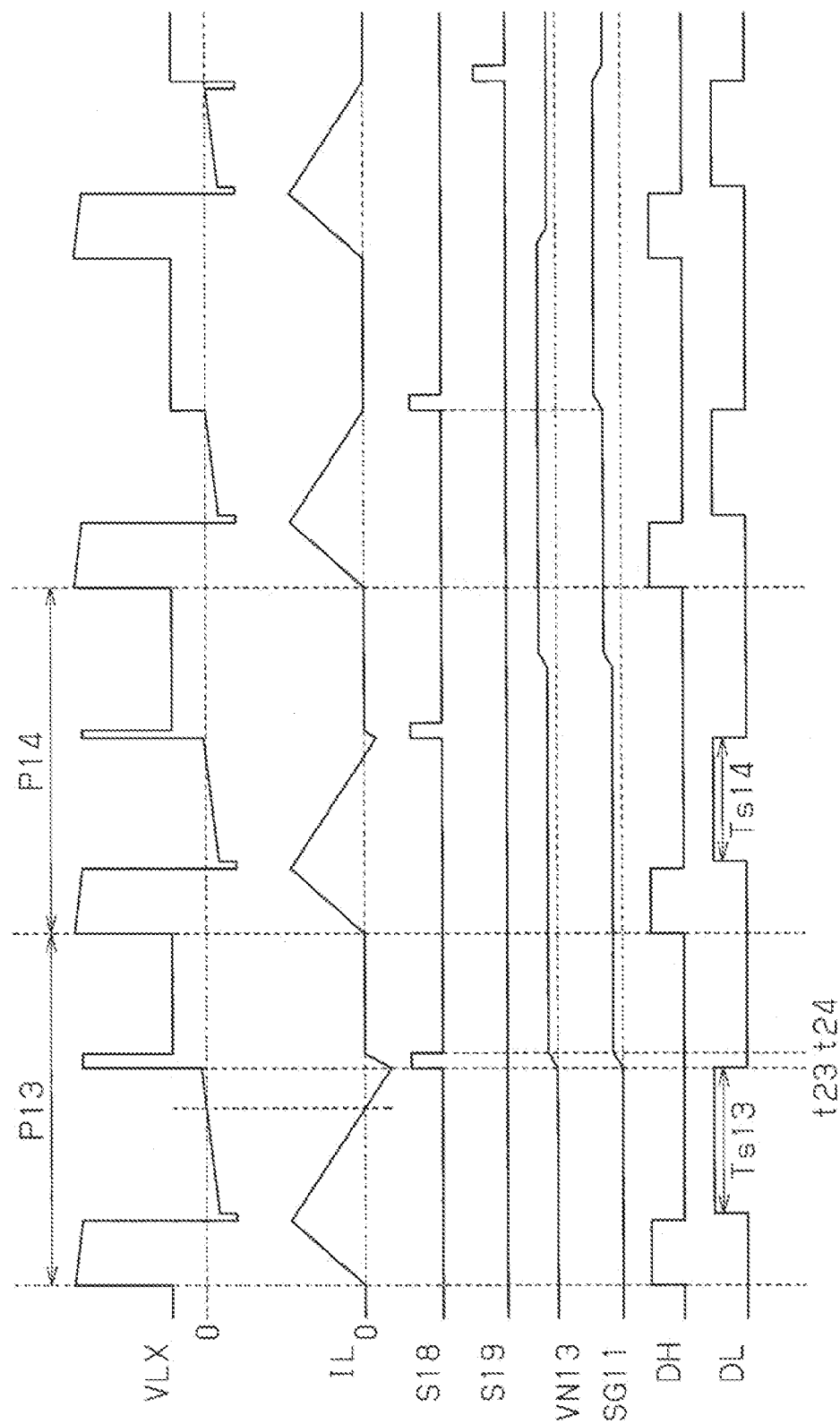
FIG. 16 is another waveform chart schematically illustrating the operations of the DC-DC converter in the second embodiment.

The operations of the DC-DC converter 4 (in particular, correction circuit 80) will now be described with reference to FIGS. 15 and 16. For example, the operations of the DC-DC converter 4 in the discontinuous current mode (DCM) will be described. The horizontal and vertical axes in FIGS. 15 and 16 are decreased or increased in scale to facilitate illustration.

First, the operations of the DC-DC converter 4 when the timing at which to detect a reverse flow of the coil current IL in the comparator 75 is advanced will be described with reference to FIG. 15.

When the voltage VC2 supplied to the comparator 75 at time t21 in the inactivation period of the main transistor T11 is higher than the voltage VC1 to output the H-level detection signal SD, the L-level control signal DL is output. In response to the L-level control signal DL, the synchronization transistor T12 is inactivated. With this, both of the transistors T11 and T12 are inactivated. As illustrated in FIG. 15, the voltage VLX at the node LX between the transistors T11 and T12 at the time (time t21) when the transistor T12 is inactivated is lower than the second reference voltage Vr12. Accordingly, the H-level signal S16 is output from the comparator 82 in the correction circuit 80. In such condition that the voltage VLX is lower than the second reference voltage Vr12 (negative potential), the reverse flow detection timing in the comparator 75 is advanced. Then, the following operations are performed to make a correction (regulation) so that the comparator 75's operation speed (reverse flow detection timing) may be delayed in the next cycle.

When the H-level signal S16 is output, the one-shot circuit 88 outputs the H-level control signal S19, to activate the switch SW12. Accordingly, charge accumulated in the capacitor C81 is released according to a current flowed by the current supply A12 (times t21 to t22). Accordingly, the voltage VN13 at the first terminal (node N13) of the capacitor C81 decreases according to the current flowed by the current supply A12. Therefore, the value of a current of the output signal of the gm amplifier 89 increases. For example, when the voltage VN13 becomes lower than the reference voltage Vr13, a current emitted from the gm amplifier 89 increases. Then, the value of a current of the correction signal SG11 supplied to the comparator 75 decreases. This enables slowing down the operation speed of the comparator 75 in the cycle P12 next to the present cycle P11, thereby delaying the reverse flow detection timing by the comparator 75. As a result, the activated period of the synchronization transistor T12 is elongated in the next cycle P12. For example, the activated period Ts12 of the transistor T12 in the next cycle P12 becomes longer than the activated period Ts11 of the transistor T12 in the present cycle P11 as illustrated in FIG. 15.

The operations of the DC-DC converter 4 when the timing at which a reverse flow of the coil current IL detected in the comparator 75 is retarded will now be described with reference to FIG. 16. When the voltage VLX at the node LX at a time (time t23) when the synchronization transistor T12 is inactivated is higher than the first reference voltage Vr11, the H-level control signal S15 is output from the comparator 81 in the correction circuit 80. In such a case that the voltage VLX is higher than the first reference voltage Vr11 (positive potential), the reverse flow detection timing in the comparator 75 is retarded. Then, the following operations are performed to make a correction (regulation) so that the comparator 75's operation speed (reverse flow detection timing) may be advanced in the next cycle.

When the H-level signal S15 is output, the one-shot circuit 87 outputs the H-level control signal S18, to activate the switch SW11. Accordingly, the capacitor C81 is charged with a current flowed by the current supply A11 (times t23 to t24). Accordingly, the voltage VN13 at the first terminal (node N13) of the capacitor C81 rises according to the current flowed by the current supply A11. Therefore, the value of a current of the output signal of the gm amplifier 89 decreases. For example, when the voltage VN13 becomes higher than the reference voltage Vr13, a current flowing into the gm amplifier 89 increases. Then, the value of a current of the correction signal SG11 supplied to the comparator 75 increases. This enables increasing the operation speed of the comparator 75 in the cycle P14 next to the present cycle P13, thereby advancing the reverse flow detection timing by the comparator 75. As a result, the activated period of the synchronization transistor T12 is shortened in the next cycle P14. For example, the activated period Ts14 of the transistor T12 in the next cycle P14 becomes shorter than the activated period Ts13 of the transistor T12 in the present cycle P13 as illustrated in FIG. 16.

By repeating the operations described above with reference to FIGS. 15 and 16, the reverse flow detection timing in the comparator 75 is optimized, thereby optimizing the activated state (inactivation timing) of the transistor T2.

As described above, the DC-DC converter 4 in the second embodiment has the following advantages.

(1) There is provided the correction circuit 80 that corrects the operation speed of the comparator 75 in such a manner as to reduce a difference between the voltage VLX at the node LX and the reference voltages Vr11 and Vr12 based on a magnitude relation between the voltage VLX and the first and second reference voltages Vr11 and Vr12 when the synchronization transistor T12 is inactivated. With this, even when the timing at which to detect a reverse flow of the coil current IL by using the comparator 75 shifts due to variations in inductance value of the coil L11 or equalization DC resistance DCR or DC superposition characteristics or temperature characteristics, etc., such shift may be corrected by the correction circuit 80. Therefore, accuracy for detection of a reverse flow of the coil current IL may be improved, thereby improving the conversion efficiency in the DC-DC converter 4.

(2) Further, even when the timing at which to detect a reverse flow of the coil current IL by using the comparator 75 shifts due to a difference between the equalization DC resistance DCR of the coil L11 as calculated based on the resistor Rs and the capacitor Cs and that of the actual coil L11, such shift may be corrected by the correction circuit 80.

(3) The resistor R2 and the capacitor Cs are coupled in parallel to the coil L11, to detect the coil current IL through DCR sensing. In this configuration, even when the resistance value of the equalization DC resistor DCR is low, by regulating the resistance value of the resistor Rs and the capacitance value of the capacitor Cs, it is possible to make the equalization DC resistance DCR sensing range relatively large. Accordingly, it is possible to increase an input voltage slew rate of the comparator 75, thereby detecting the reverse flow of the coil current IL speedily.

The second embodiment may be carried out in the following mode.

Figure 17:
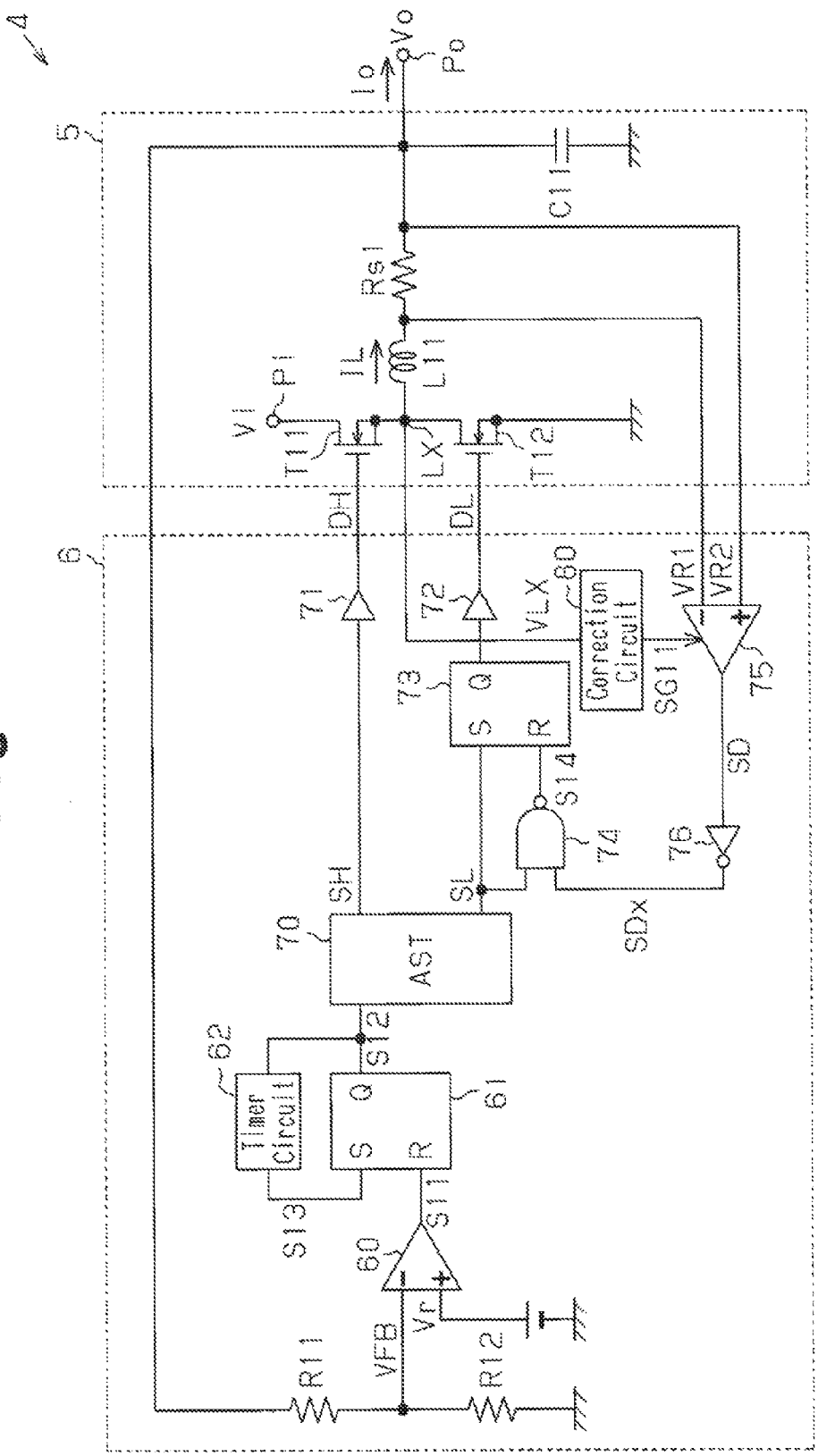
FIG. 17 is a block circuit diagram schematically illustrating a modification of the DC-DC converter in FIG. 12.

The second embodiment has detected the coil current IL through DCR sensing by coupling the resistor Rs and the capacitor Cs in parallel with each other to the coil L11. The present invention is not limited to it. For example, as illustrated in FIG. 17, a sense resistor Rs1 may be inserted between the coil L11 and the output terminal Po to detect the coil current IL based on a difference in potential across the sense resistor Rs1. In this case, the comparator 75 is supplied at its inverting input terminal with the voltage VR1 of the first terminal (input terminal) of the sense resistor Rs1 and at its non-inverting input terminal with the voltage VR2 of the second terminal (output terminal) of the sense resistor Rs1.

Figure 18:
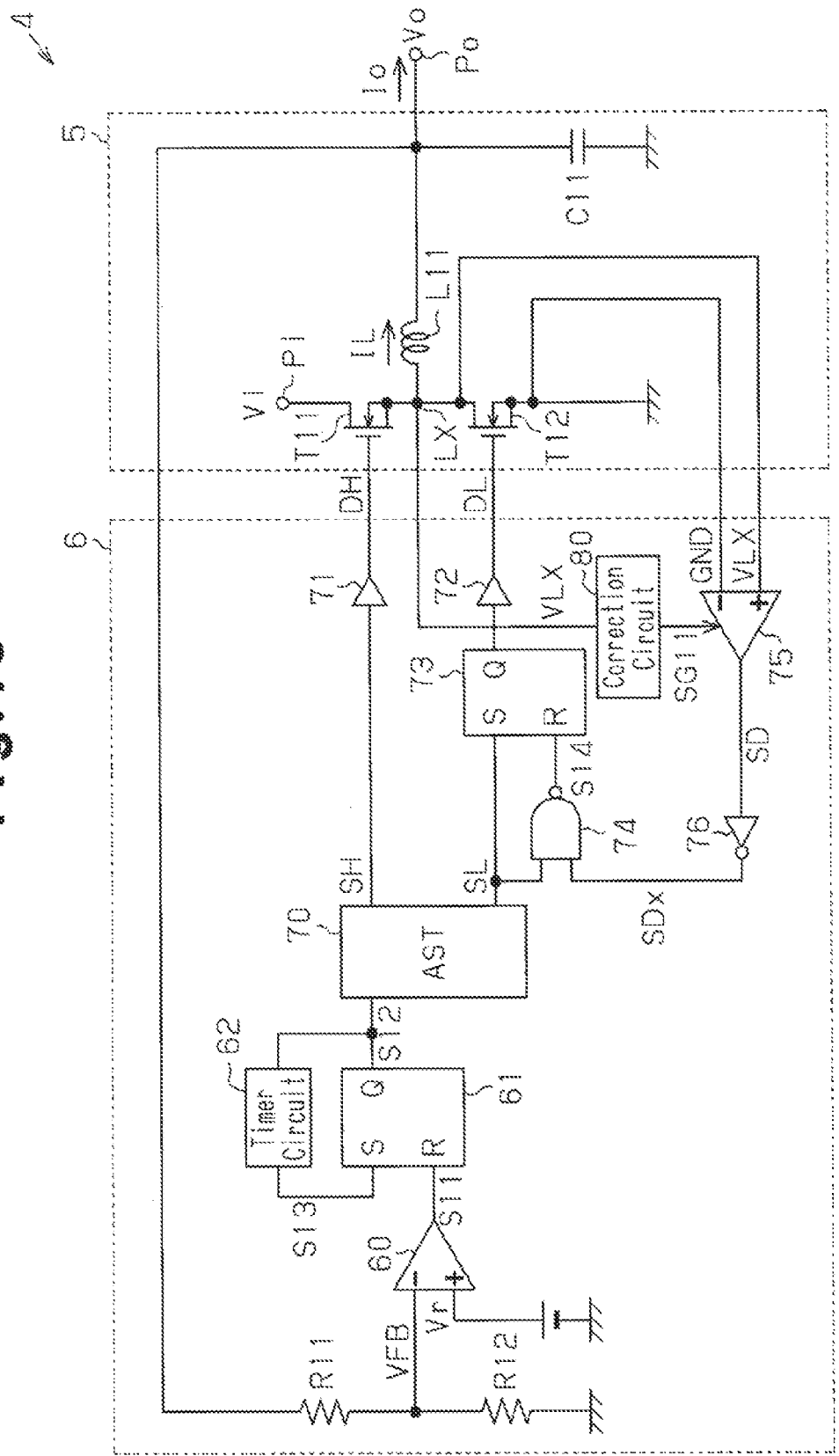
FIG. 18 is another block circuit diagram schematically illustrating the modification of the DC-DC converter in FIG. 12.

Further, as illustrated in FIG. 18, the coil current IL may be detected by assuming the on resistance of the synchronization transistor T12 to be a sense resistance. In this case, the comparator 75 is supplied at its non-inverting input terminal with the voltage VLX of the drain of the transistor T12 (node LX) and at its inverting input terminal with the source voltage of the transistor T12, that is, the ground voltage GND.

The second embodiment has employed the configuration to generate the pulse signal S13 that rises to the H level after the period depending on the input voltage Vi and the output voltage Vo elapses starting from a timing at which the signal S12 rises. The configuration of the timer circuit 62 may be changed appropriately. For example, the timer circuit 62 may be configured in such a manner as to output the H-level pulse signal S13 after a fixed period of time elapses. Further, the timer circuit 62 may be configured to output the H-level pulse signal S13 at a timing that depends on the input voltage Vi (or the output voltage Vo).

The configuration of the correction circuit 80 in the second embodiment may be changed appropriately.

Although the second embodiment has employed the DC-DC converter 4 of a comparator type, the present invention is not limited to it. For example, the DC-DC converter using an error amplifier, for example, may be specified.

Although the second embodiment has used the feedback voltage VFB by dividing the output voltage Vo generated using the resistors R11 and R12, the present invention is not limited to it. For example, the output voltage Vo itself may be used as the feedback voltage VFB.

Although the second embodiment has used an N-channel MOS transistor as one example of the switch circuit, a P-channel MOS transistor may be used instead. Further, a bipolar transistor may be used as the switch circuit. Alternatively, the switch circuit may include a plurality of transistors.

In the second embodiment, the transistors T11 and T12 may be included in the control circuit 6. Further, the converter unit 5 may be included in the control circuit 6.

It should be apparent to those skilled in the art that the present invention may be embodied in many other specific forms without departing from the spirit or scope of the invention. Particularly, it should be understood that the present invention may be embodied in the following forms.

Figure 19:
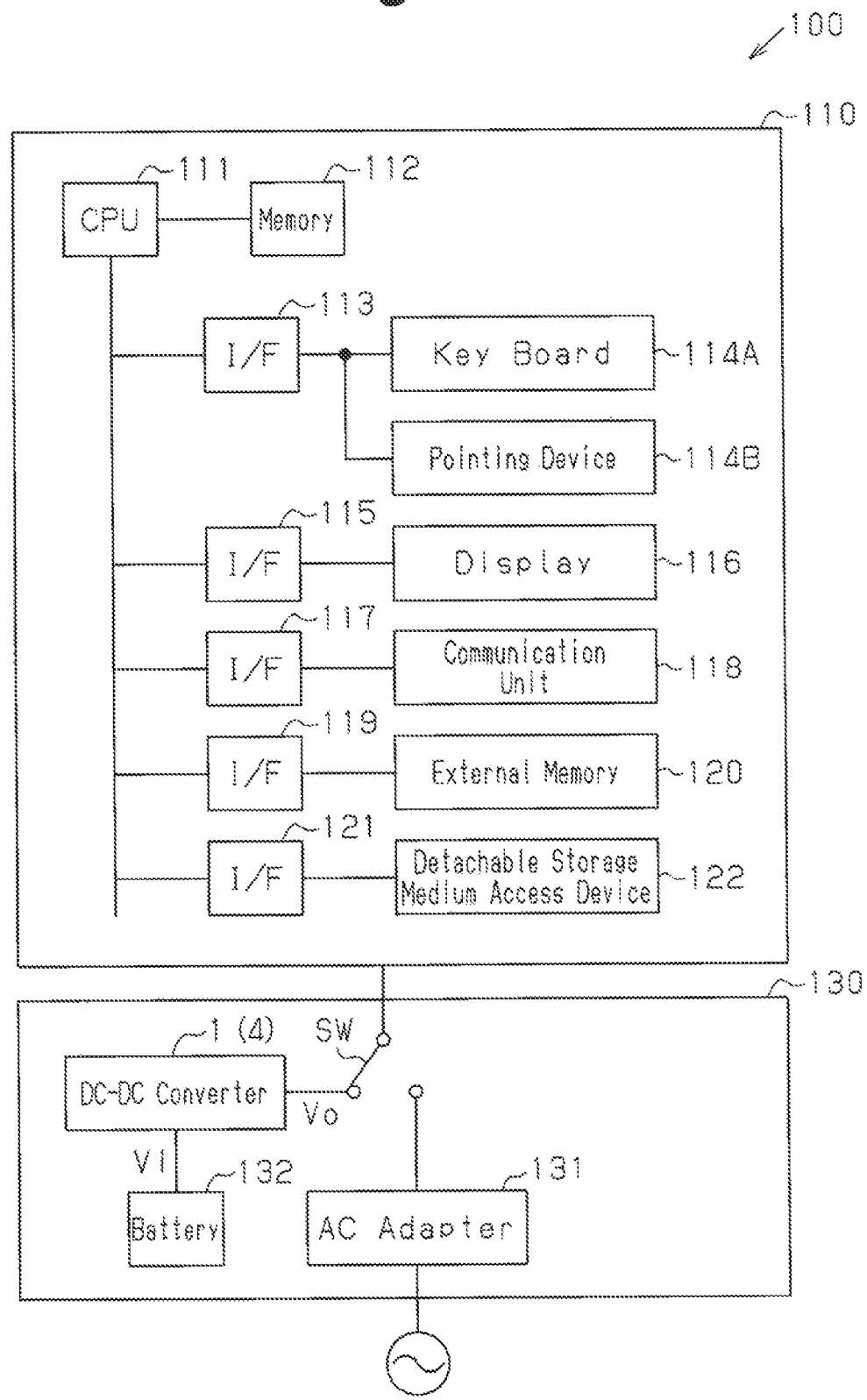
FIG. 19 is a block diagram schematically illustrating an electronic device including the DC-DC converter of FIG. 1 or 12.

FIG. 19 illustrates one example of an electronic device including the DC-DC converter 1 or 4. The electronic device 100 has a body unit 110 (internal circuit) and a power supply unit 130.

The body unit 110 has a CPU 111 executing a program and a memory 112 storing the program executed by the CPU 111 or data processed by the CPU 111. Further, the body unit 110 has a keyboard 114A and a pointing device 114B coupled to the CPU 111 via an interface (I/F) 113. The pointing device 114B may come in, for example, a mouse, a track ball, or a flat device having a touch panel or electrostatic sensor.

Further, the body unit 110 has a display 116 coupled to the CPU 111 via an interface 115. The display 116 may come in, for example, a liquid crystal display (LCD) or an electroluminescence (EL) panel.

Further, the body unit 110 has a communication unit 118 coupled to the CPU 111 via an interface 117. The communication unit 118 may come in, for example, a local area network (LAN) board.

Further, the body unit 110 has an external memory 120 coupled to the CPU 111 via an interface 119. The external memory 120 may come in, for example, a hard disk.

Further, the body unit 110 has an attachable/detachable storage medium access device 122 coupled to the CPU 11 via an interface 121. The medium attachable to and detachable from the device 122 may be, for example, a compact disk (CD), a digital versatile disk (DVD), or a flash memory card.

The body unit 110 is supplied with power from the power supply unit 130. The power supply unit 130 is coupled through the switch SW to the DC-DC converter 1 (or DC-DC converter 4) and an AC adapter 131. Power is supplied to the body unit 110 from either one of those DC-DC converter 1 (or DC-DC converter 4) and AC adapter 131. The DC-DC converter 1 (or DC-DC converter 4) converts a voltage (input voltage Vi) from a battery 132, for example, into the output voltage Vo and supplies the output voltage Vo to the body unit 110 in an example in FIG. 19.

Such an electronic device may come in, for example, a laptop, a communication device such as a cellular phone, an information processing device such as a personal digital assistant (PDA), a video device such as a digital camera or video camera, or a receiver such as a TV set.

All examples and conditional language recited herein are intended for pedagogical purposes to aid the reader in understanding the principles of the invention and the concepts contributed by the inventor to furthering the art, and are to be construed as being without limitation to such recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A power supply comprising:
    a converter including a first switch and a second switch coupled between a first potential and a second potential; and
    a control circuit that controls activation and inactivation of the first switch and the second switch, wherein the control circuit includes:
        a detection circuit that detects a magnitude relation of a voltage value at a node between the first and second switches and a reference value during a period in which the first switch and the second switch are inactivated, wherein the detection circuit generates a control signal corresponding to the magnitude relation;
        a first timer circuit that generates a first pulse signal having a first pulse width to activate the first switch;
        a second timer circuit that generates a second pulse signal having a second pulse width to activate the second switch; and
        a regulation circuit that regulates a switching timing of the second switch in response to the control signal to decrease a difference between the voltage value at the node and the reference value and regulates the first pulse width of the first pulse signal or the second pulse width of the second pulse signal in accordance with the control signal.

2. A control circuit for controlling a power supply, the control circuit comprising:
    a detection circuit that detects a magnitude relation of a reference value and a voltage value at a node between a first switch and a second switch, which are coupled between a first potential and a second potential, during a period in which the first switch and the second switch are inactivated, wherein the detection circuit generates a control signal corresponding to the magnitude relation;
    a first timer circuit that controls activation and inactivation of the first switch;
    a second timer circuit that controls activation and inactivation of the second switch; and
    a regulation circuit coupled to at least one of the first timer circuit and the second timer circuit that regulates a switching timing of the second switch in response to the control signal to decrease a difference between the voltage value at the node and the reference value.

3. The control circuit according to claim 2, wherein the regulation circuit is configured to regulate the switching timing of the second switch in response to the control signal so that the voltage value at the node when the second switch is inactivated approaches the reference value.

4. The control circuit according to claim 3, wherein the regulation circuit generates a regulation signal that advances an inactivation timing of the second switch when the voltage value at the node is higher than a first reference value and retards an inactivation timing of the second switch when the voltage value at the node is lower than a second reference value.

5. The control circuit according to claim 2, wherein the regulation circuit includes:
   a capacitor charged and discharged in accordance with the control signal from the detection circuit; and
   an amplifier that generates a regulation signal for regulating the switching timing of the second switch based on the amount of charge accumulated in the capacitor.

6. The control circuit according to claim 5, wherein the amplifier is a transconductance amplifier that controls the amount of current of the regulation signal in accordance with a difference of the amount of charge accumulated in the capacitor and the reference voltage.

7. The control circuit according to claim 5, wherein the detection circuit includes:
   a first pulse circuit that generates a one-shot pulse to start charging the capacitor when the voltage at the node is higher than a first reference value; and
   a second pulse circuit that generates a one-shot pulse to start charging the capacitor when the voltage at the node is lower than a second reference value.

8. The control circuit according to claim 1, wherein the detection circuit comprises:
   a first comparator that compares a voltage value at the node with a first reference value, which is a first potential to generate a first signal; and
   a second comparator that compares a voltage value at the node with a second reference value, which is a second potential, to generate a second signal,
   wherein the detection circuit generates a control signal that corresponds to a magnitude relation of the voltage value at the node and the first and second reference values in accordance with the first and second signals.

9. A control circuit for controlling a power supply, the control circuit comprising:
   a detection circuit that detects a magnitude relation of a reference value and a voltage value at a node between a first switch and a second switch, which are coupled between a first potential and a second potential, during a period in which the first switch and the second switch are inactivated, wherein the detection circuit generates a control signal corresponding to the magnitude relation;
   a first timer circuit that generates a first pulse signal having a first pulse width to activate the first switch;
   a second timer circuit that generates a second pulse signal having a second pulse width to activate the second switch; and
   a regulation circuit that regulates a switching timing of the second switch in response to the control signal to decrease a difference between the voltage value at the node and the reference value and regulates the second pulse width of the second pulse signal in accordance with the control signal.

10. The control circuit according to claim 9, wherein the regulation circuit includes an amplifier coupled between the detection circuit and the second timer circuit, wherein the amplifier generates a regulation signal that finely regulates the second pulse width of the second pulse signal in accordance with the control signal from the detection circuit, and the amplifier provides the regulation signal to the second timer circuit.

11. A control circuit for controlling a power supply, the control circuit comprising:
   a detection circuit that detects a magnitude relation of a reference value and a voltage value at a node between a first switch and a second switch, which are coupled between a first potential and a second potential, during a period in which the first switch and the second switch are inactivated, wherein the detection circuit generates a control signal corresponding to the magnitude relation;
   a first timer circuit that generates a first pulse signal having a first pulse width to activate the first switch;
   a second timer circuit that generates a second pulse signal having a second pulse width to activate the second switch; and
   a regulation circuit that regulates a switching timing of the second switch in response to the control signal to decrease a difference between the voltage value at the node and the reference value and regulates the first pulse width of the first pulse signal in accordance with the control signal.

12. The control circuit according to claim 11, wherein the regulation circuit includes an amplifier coupled between the detection circuit and the first timer circuit, wherein the amplifier generates a regulation signal that finely regulates the first pulse width of the first pulse signal in accordance with the control signal from the detection circuit, and the amplifier provides the regulation signal to the first timer circuit.

13. A control circuit for controlling a power supply, the control circuit comprising:
   a reverse flow detection circuit that detects coil current flowing reversely in a choke coil coupled to a node between a first switch and a second switch, which are coupled between a first potential and a second potential;
   a detection circuit that detects a magnitude relation of a voltage value at the node and a reference value during a period in which the first switch and the second switch are inactivated, wherein the detection circuit generates a control signal corresponding to the magnitude relation;
   a timer circuit that generates a pulse signal having a pulse width to activate the first switch or the second switch; and
   a correction circuit that corrects an operation speed of the reverse flow detection circuit in response to the control signal to decrease a difference between the voltage value at the node and the reference value and regulates the pulse width of the pulse signal in accordance with the control signal.

14. The control circuit according to claim 13, wherein the detection circuit includes:
   a first comparator that compares the voltage value at the node with a first reference value and generates a first signal; and
   a second comparator that compares the voltage value at the node with a second reference value and generates a second signal,
   wherein the detection circuit generates the control signal corresponding to a magnitude relation of the voltage value at the node and the first and second reference values in accordance with the first and second signals.

15. The control circuit according to claim 14, wherein the detection circuit includes:
   a first pulse circuit that generates a first one-shot pulse based on the first signal; and
   a second pulse circuit that generates a second one-shot pulse based on the second signal,
   wherein the correction circuit increases the operation speed of the reverse flow detection circuit in response to the first one-shot pulse and decreases the operation speed of the reverse flow detection circuit in response to the second one-shot pulse.

16. An electronic device comprising:
a power supply; and
an internal circuit supplied with voltage generated by the power supply, wherein the power supply includes:
- a first switch and a second switch coupled between a first potential and a second potential;
- a detection circuit that detects a magnitude relation of a reference value and a voltage value at a node between the first and second switches during a period in which the first switch and the second switch are inactivated, wherein the detection circuit generates a control signal corresponding to the magnitude relation;
- a first timer circuit that controls activation and inactivation of the first switch;
- a second timer circuit that controls activation and inactivation of the second switch; and
- a regulation circuit coupled to at least one of the first timer circuit and the second timer circuit that regulates a switching timing of the second switch in response to the control signal to decrease a difference between the voltage value at the node and the reference value.

17. A method for controlling a power supply, the method comprising:
- detecting a magnitude relation of a reference value and a voltage value at a node between a first switch and a second switch, which are coupled between a first potential and a second potential, during a period in which the first switch and the second switch are inactivated;
- generating a first pulse signal having a first pulse width to activate the first switch;
- generating a second pulse signal having a second pulse width to activate the second switch;
- generating a control signal corresponding to the magnitude relation; and
- regulating a switching timing of the second switch in response to the control signal to decrease a difference between the voltage value at the node and the reference value and regulating the first pulse width of the first pulse signal or the second pulse width of the second pulse signal in accordance with the control signal.

18. The method according to claim 17, further comprising:
- advancing an inactivation timing of the second switch when the voltage value at the node is higher than the first reference value; and
- retarding an inactivation timing of the second switch when the voltage value at the node is lower than the second reference value.

\* \* \* \* \*